(12) United States Patent
Shenfield et al.

(10) Patent No.: US 7,853,674 B2
(45) Date of Patent: Dec. 14, 2010

(54) SYSTEM AND METHOD FOR PROVISIONING COMPONENT APPLICATIONS

(75) Inventors: Michael Shenfield, Richmond Hill (CA); Brindusa Fritsch, Toronto (CA); Sean Taylor, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1100 days.

(21) Appl. No.: 11/039,952

(22) Filed: Jan. 24, 2005

(65) Prior Publication Data

US 2006/0168355 A1 Jul. 27, 2006

(51) Int. Cl.
*G06F 15/177* (2006.01)
*G06F 15/16* (2006.01)

(52) U.S. Cl. ........................ 709/221; 709/218
(58) Field of Classification Search ................. 709/201, 709/206, 250; 717/168–178
See application file for complete search history.

(56) References Cited

U.S. PATENT DOCUMENTS

| | | | |
|---|---|---|---|
| 6,286,041 B1 | 9/2001 | Collins, III et al. | |
| 7,254,614 B2 * | 8/2007 | Mulligan et al. | 709/207 |
| 7,266,582 B2 * | 9/2007 | Stelting | 709/201 |
| 7,275,243 B2 * | 9/2007 | Gibbons et al. | 717/159 |
| 2002/0026474 A1 | 2/2002 | Wang et al. | |
| 2002/0103884 A1 | 8/2002 | Duursma et al. | |
| 2003/0105864 A1 * | 6/2003 | Mulligan et al. | 709/225 |
| 2003/0187916 A1 | 10/2003 | Dettinger | |
| 2004/0030740 A1 | 2/2004 | Stelting | |
| 2004/0093595 A1 * | 5/2004 | Bilange | 717/171 |
| 2004/0110497 A1 | 6/2004 | Little | |
| 2004/0158577 A1 * | 8/2004 | Chu et al. | 707/103 R |
| 2004/0260774 A1 * | 12/2004 | Jensen et al. | 709/206 |

FOREIGN PATENT DOCUMENTS

| | | |
|---|---|---|
| WO | WO 00/36803 A1 | 6/2000 |
| WO | WO 2004/059938 A2 | 7/2004 |

OTHER PUBLICATIONS

Search Report and Written Opinion Issued by the European Patent Office for corresponding European Patent Application No. EP 05100434.

(Continued)

*Primary Examiner*—William C Vaughn, Jr.
*Assistant Examiner*—Shirley X Zhang
(74) *Attorney, Agent, or Firm*—Gowling Lafleur Henderson LLP

(57) ABSTRACT

A system and method are provided for provisioning component applications for retrieval by a device. The system includes an application gateway server, which includes a message broker for communicating between the system and the device. The application gateway server is configured for communication with a provisioning server and a discovery server. The provisioning server includes a provisioning service for servicing a provisioning request and a provisioning depot for storing packaged component applications. The discovery server stores and manages component application bundles. The system further includes a packaging application in communication with application gateway for retrieving a component application bundle, selecting elements from the component application bundle in accordance with the device for which the component application is being provisioned, creating a component application package using the selected elements, and making the packaged component application available to the device.

19 Claims, 27 Drawing Sheets

OTHER PUBLICATIONS

Office Action issued by the Canadian Intellectual Property Office dated May 12, 2009 for corresponding Canadian Patent Application No. 2,533,608.

Office Action issued by the State Intellectual Property Office dated Jul. 11, 2008 for corresponding Chinese Patent Application No. 200610006226.8.

Office Action issued by the State Intellectual Property Office dated Dec. 26, 2008 for corresponding Chinese Patent Application No. 200610006226.8.

Examination Report issued by the Government of India Patent Office dated Sep. 19, 2008 for corresponding Indian Patent Application No. 132/DEL/2006.

* cited by examiner

SYSTEM AND METHOD FOR PROVISIONING COMPONENT APPLICATIONS

The present invention relates generally to a communication system for providing communication to a plurality of devices and specifically to a system and method for provisioning component applications on such devices.

BACKGROUND OF THE INVENTION

Due to the proliferation of wireless networks, there are a continually increasing number of wireless devices in use today. These devices include mobile telephones, personal digital assistance (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

Currently, devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Applications for browsers are efficient tools for designing platform independent applications. Accordingly, different runtime environments, regardless of the platform, execute the same application. However, since different wireless devices have different capabilities and form factors, the application may not be executed or displayed as desired. Further, browser based application often require significant transfer bandwidth to operate efficiently, which may be costly or even unavailable for some wireless devices.

On the other hand, native applications are developed for a specific wireless device platform, thereby providing a relatively optimized application program for a runtime environment running on that platform. However, a platform dependent application introduces several drawbacks, including having to develop multiple versions of the same application and being relatively large in size, thereby taxing memory resources of the wireless device. Further, application developers need experience with programming languages such as Java and C++ to construct such native applications.

Systems and methods disclosed herein provide a communication system for provisioning component-based applications on devices to obviate or mitigate at least some of the aforementioned disadvantages.

SUMMARY OF THE INVENTION

In accordance with an aspect of the present invention there is provided a system for provisioning component applications for retrieval by a device, the system comprising: an application gateway server including a message broker for communicating between the system and the device, the application gateway server configured for communication with a provisioning server and a discovery server, the provisioning server including a provisioning service for servicing a provisioning request and a provisioning depot for storing packaged component applications, the discovery server for storing and managing component application bundles; and a packaging application in communication with application gateway for retrieving a component application bundle, selecting elements from the component application bundle in accordance with the device for which the component application is being provisioned, creating a component application package using the selected elements, and making the packaged component application available to the device.

In accordance with yet another aspect of the present invention there is provided a method for provisioning a component application for a device by a gateway application server, the method comprising the steps of: receiving, at the gateway application server, a request to provision a component application; determining whether or not the component application is packaged and, if so, making it available to the device; locating and retrieving a component application bundle, associated with the component application, from a component application depot for packaging; packaging the component application by selecting elements from the component application bundle in accordance with the device for which the component application is being provisioned, creating a component application package using the selected elements; and making the packaged component application available to the device.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
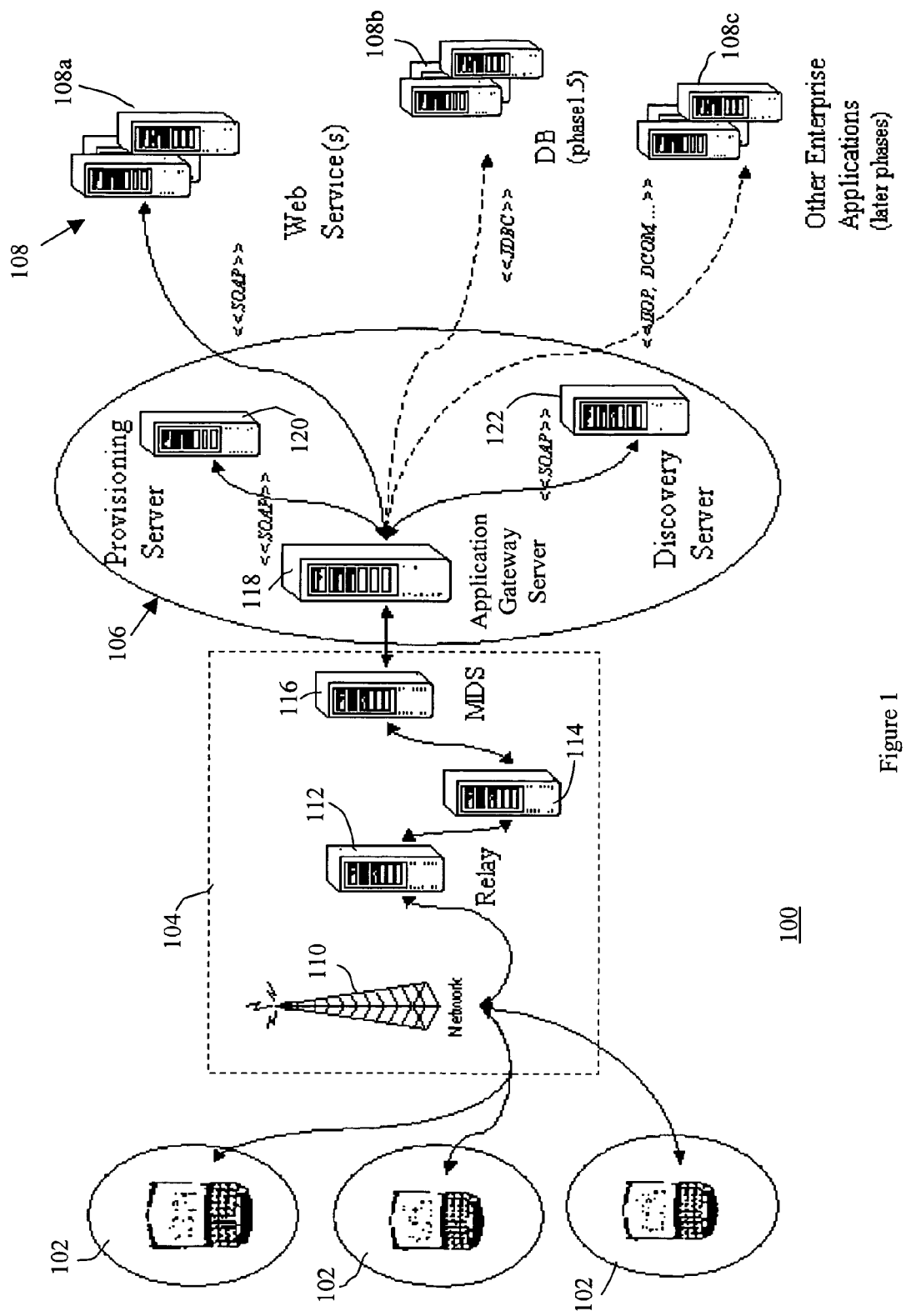
FIG. 1 is block diagram of a network facilitating wireless component applications.

For convenience, like numerals in the description refer to like structures in the drawings. Referring to FIG. 1, a communication infrastructure is illustrated generally by numeral 100. The communication infrastructure 100 comprises a plurality of wireless devices 102, a communication network 104, an application gateway 106, and a plurality of backend services 108.

The wireless devices 102 are typically personal digital assistants (PDAs), such as a Blackberry™ by Research in Motion for example, but may include other devices. Each of the wireless devices 102 includes a runtime environment capable of hosting a plurality of component applications.

Component applications comprise one or more data components, presentation components, and/or message components, which are written in a structured definition language such as Extensible Markup Language (XML) code. The component applications can further comprise workflow components which contain a series of instructions such as written in a subset of ECMAScript, and can be embedded in the XML code in some implementations. Therefore, since the applications are compartmentalized, a common application can be written for multiple devices by providing corresponding presentation components without having to rewrite the other components. Further, large portions of the responsibility of typical applications are transferred to the runtime environment for component application. The details of the component applications are described at the end of this description.

The wireless devices 102 are in communication with the application gateway 106 via the communication network 104. Accordingly, the communication network 104 may include several components such as a wireless network 110, a relay 112, a corporate server 114 and/or a mobile data server 116 for relaying data between the wireless devices 102 and the application gateway 106.

The application gateway 106 comprises a gateway server 118, a provisioning server 120 and a discovery server 122. The gateway server 118 acts as a message broker between the runtime environment on the wireless devices 102 and the backend servers 108. The gateway server 118 is in communication with both the provisioning server 120 and the discovery server 122. The gateway server 110 is further in communication with a plurality of the backend servers 108, such as web services 108a, database services 108b, as well as other enterprise services 108c, via a suitable link. For example, the gateway server 110 is connected with the web services 108a and database services 108b via Simple Object Access Protocol (SOAP) and Java Database Connectivity (JDBC) respectively. Other types of backend servers 108 and their corresponding links will be apparent to a person of ordinary skill in the art.

Each wireless device 102 is initially provisioned with a service book establishing various protocols and settings, including connectivity information for the corporate server 114 and/or the mobile data server 116. These parameters may include a Uniform Resource Locator (URL) for the application gateway server 118 as well as its encryption key. Alternately, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
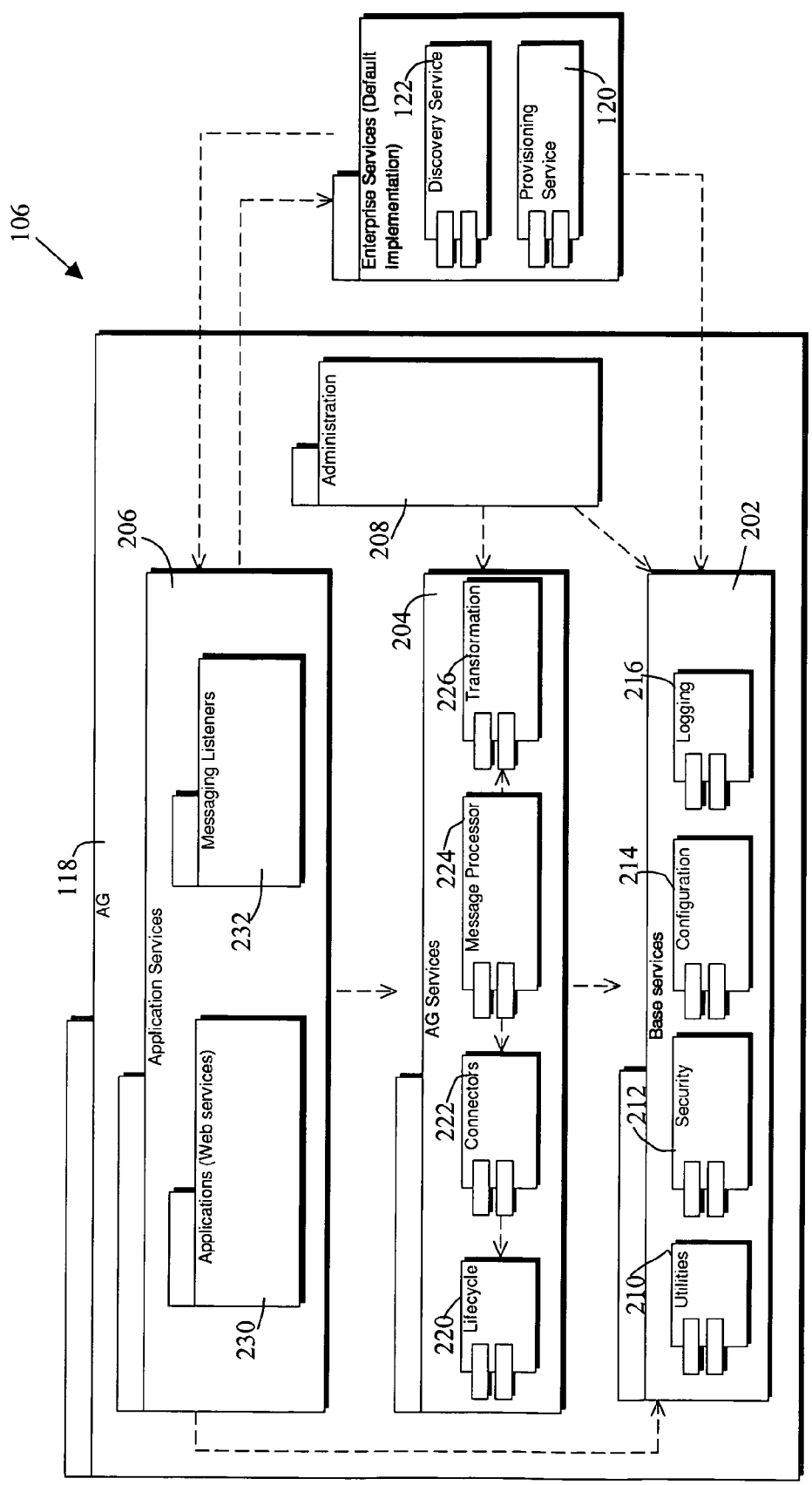
FIG. 2 is a detailed block diagram of the application gateway shown in FIG. 1.

Referring to FIG. 2, a more detailed view of the application gateway 106 is shown. The application gateway server 118 includes three layers of service; a base services layer 202, an application gateway services layer 204 and an application services layer 206. The application gateway server 118 further includes an administration service 208.

A provisioning service 210 and a discovery service 212 are provided by the provisioning server 120 and discovery server 120, respectively.

At the lowest level, the base services layer 202 offers basic, domain independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain specific services. These services provide efficient message transformation and delivery to backend systems 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The components of the application gateways 106 are described in detail as follows.

Messaging Listening Application

The messaging listening application provides an interface for receiving messages from the wireless devices 102 as well as external sources and forwarding them to the messaging subsystem. Further, the message listening application typically authenticates that the source of the message is valid.

Figure 3:
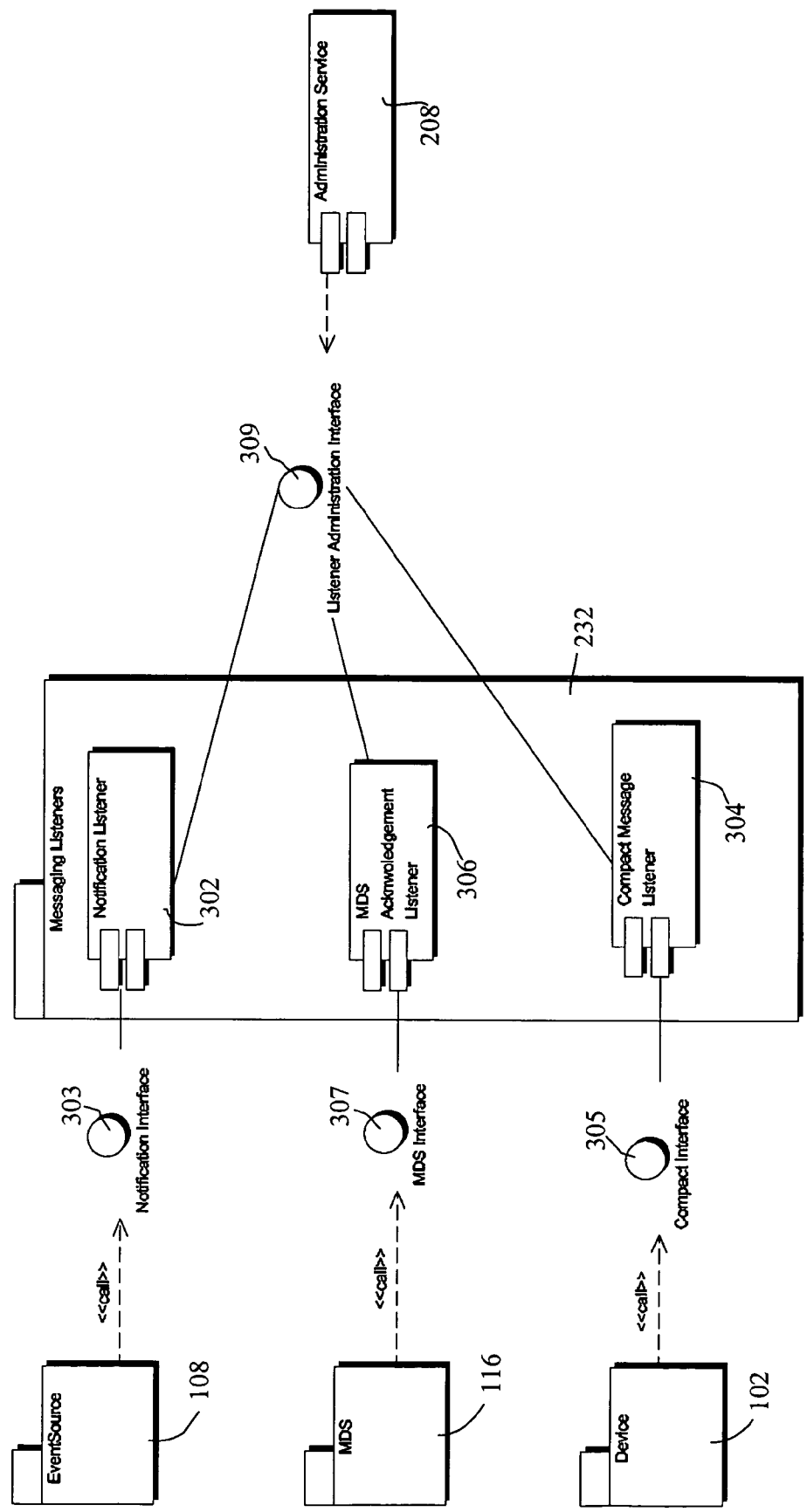
FIG. 3 is a block diagram of a message listening application.

Referring to FIG. 3, the message listening application is shown in greater detail. The message listening application includes three listeners; a notification listener 302, a compact message listener 304, and a mobile data service acknowledgement listener 306. The notification listener 302 receives notification and response messages from event sources 108c via a notification interface 303.

For example, the notification interface 303 may be implemented using Web Service (WS) Eventing. Web services often want to receive messages when events occur in other services, such as the event sources, and applications. A mechanism for registering interest is provided in the art by WS Subscription. WS Subscription defines a protocol for one Web service, referred to as a subscriber, to register interest with another Web service, referred to as an event source for receiving messages about events, referred to as notifications. When the event source notifies the subscriber of an event, it is referred to as WS Eventing.

The compact message listener 304 receives messages from the mobile devices 102 via a compact message interface 305. The mobile data service acknowledgment listener 306 receives and acknowledges notifications from the mobile data service 116 via a mobile data service interface 307. Each of the three listeners 302, 304 and 306 receive administrative messages from the administration service 208 via a listener administrative interface 309.

In the present embodiment the listener interfaces 303, 305, 307, and 309 are configured using Hypertext Transfer Protocol/Hypertext Transfer Protocol over Secure Socket Layer (HTTP/HTTPS). However, it will be appreciated by a person skilled in the art that these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message, be it the mobile data service 116, the wireless device 102 or event source 108 is valid. Further, if reliable messaging required, service availability is ensured and the listeners deal with availability attack solutions. In order to facilitate this, the messaging subsystem defines a threshold for a maximum number of messages and connections for a given time period from any backend server 108, component application or wireless device. The administrator can modify this threshold as desired, as well as allow for specific exceptions via the administration service 208.

Further, since message interception and replay attack is possible, the listeners detect and prohibit this attack using mechanisms that identify replayed messages. These mechanisms typically include the use of a nonce. A nonce is defined as parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Lifecycle Subsystem

Figure 4:
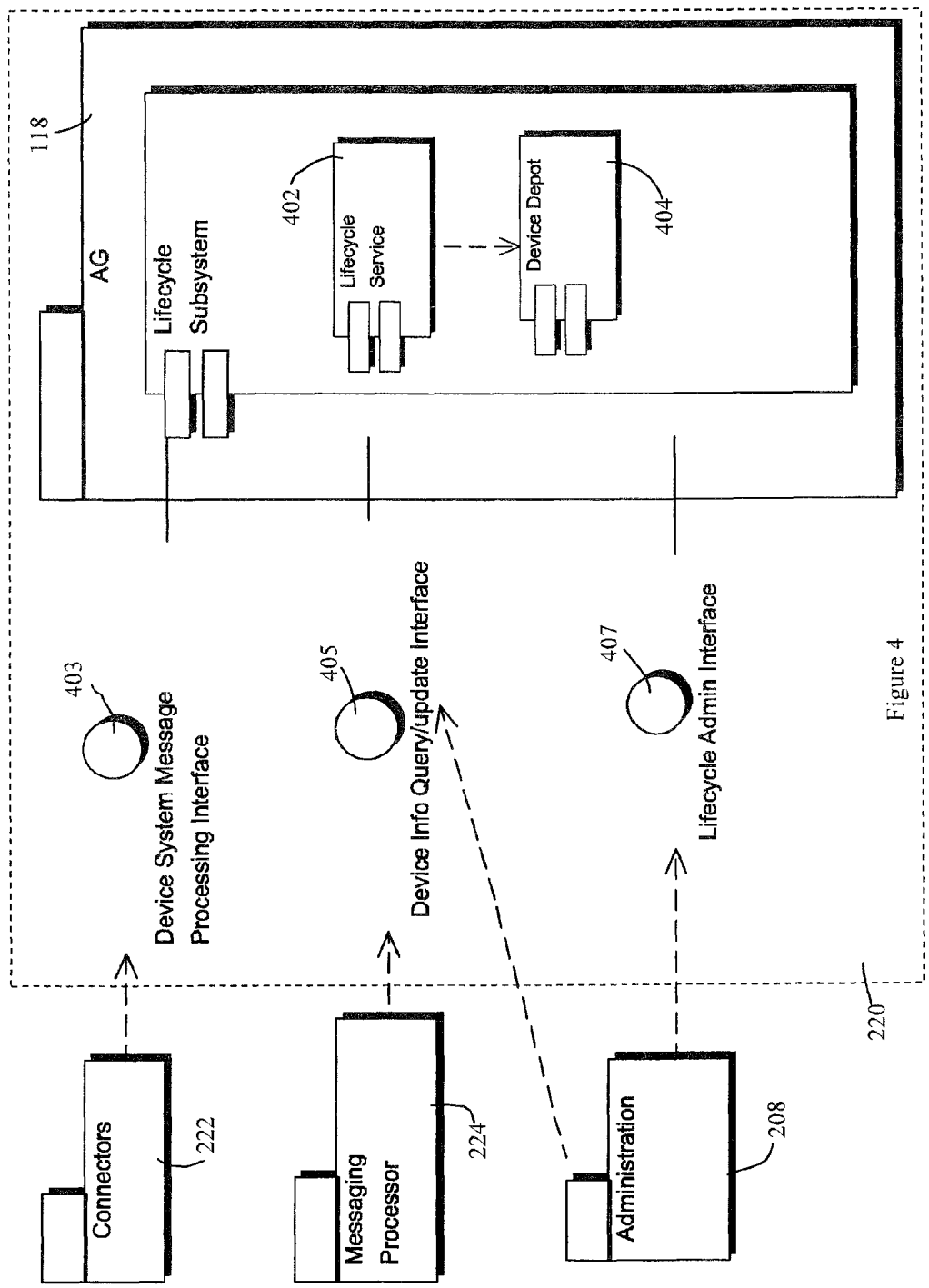
FIG. 4 is a block diagram of a lifecycle subsystem.

Referring to FIG. 4, the lifecycle subsystem 220 is shown in greater detail. The lifecycle subsystem includes a lifecycle service 402 and a device depot 404.

The lifecycle service 402 processes device initiated messages that relate to the wireless device 104, the runtime environment lifecycle and the component application lifecycle. Such messages, for example, may relate to a wireless device registration or suspension, wireless device swap, wireless device availability, a component application installation, upgrade, or deletion, and runtime environment upgrades. These messages are communicated to and from the connector subsystem 222 via a device system message processing interface 403.

The lifecycle service 402 further provides the ability to query for wireless devices and component application using various filters. In order to facilitate this feature, the lifecycle service 402 communicates with the messaging subsystem 224 and the administration subsystem 208 via a device information query/update interface 405. In the present embodiment, the device information query/update interface 405 is implemented using a set of Java application program interfaces (APIs) for querying and updating device information. Typical interfaces include those for managing the wireless device's security and client administration policy.

The lifecycle subsystem 220 manages a security profile for each wireless device 104 registered with the application gateway 106 in the device depot 404. Each security profile includes a secure symmetric key for each device. This key is used for secure communication between the wireless device 104 and application gateway 106.

The client administration policy includes retrieving wireless device status, searching for component applications with certain programmable criteria, and search for devices with certain programmable criteria. For example, it may be desirable to determine which component applications are installed on all the wireless devices or which wireless devices a have specific component application installed.

Yet further, a lifecycle administration interface 407 is provided for facilitating the management of the lifecycle subsystem 402 and the device depot 404 by the administration subsystem 208. For example, the administration subsystem can indicate the availability of a new version of a component application or the runtime environment.

Accordingly, the lifecycle service 402 manages the status of each of a plurality of assigned wireless devices 102, including the runtime environment and component applications stored therein. Information such as the runtime environment, component application status, and the wireless device security settings are stored in the lifecycle depot. The security settings may include, for example, client administration policy and the wireless device's encryption key.

The application gateway server 118 also allows for the use of third party lifecycle components, also referred to as lifecycle service providers, which are typically external to the application gateway 106. In order to facilitate lifecycle service providers, lifecycle service provider listeners are provided at the application services layer. The lifecycle service provider listeners are responsible for receiving notification on all lifecycle system messages from the lifecycle service providers and transmitting them to the administration subsystem 208 for processing. Further, the lifecycle service providers can access the administration service to configure the application gateway server 118 or send system messages.

Administration Subsystem

Figure 5:
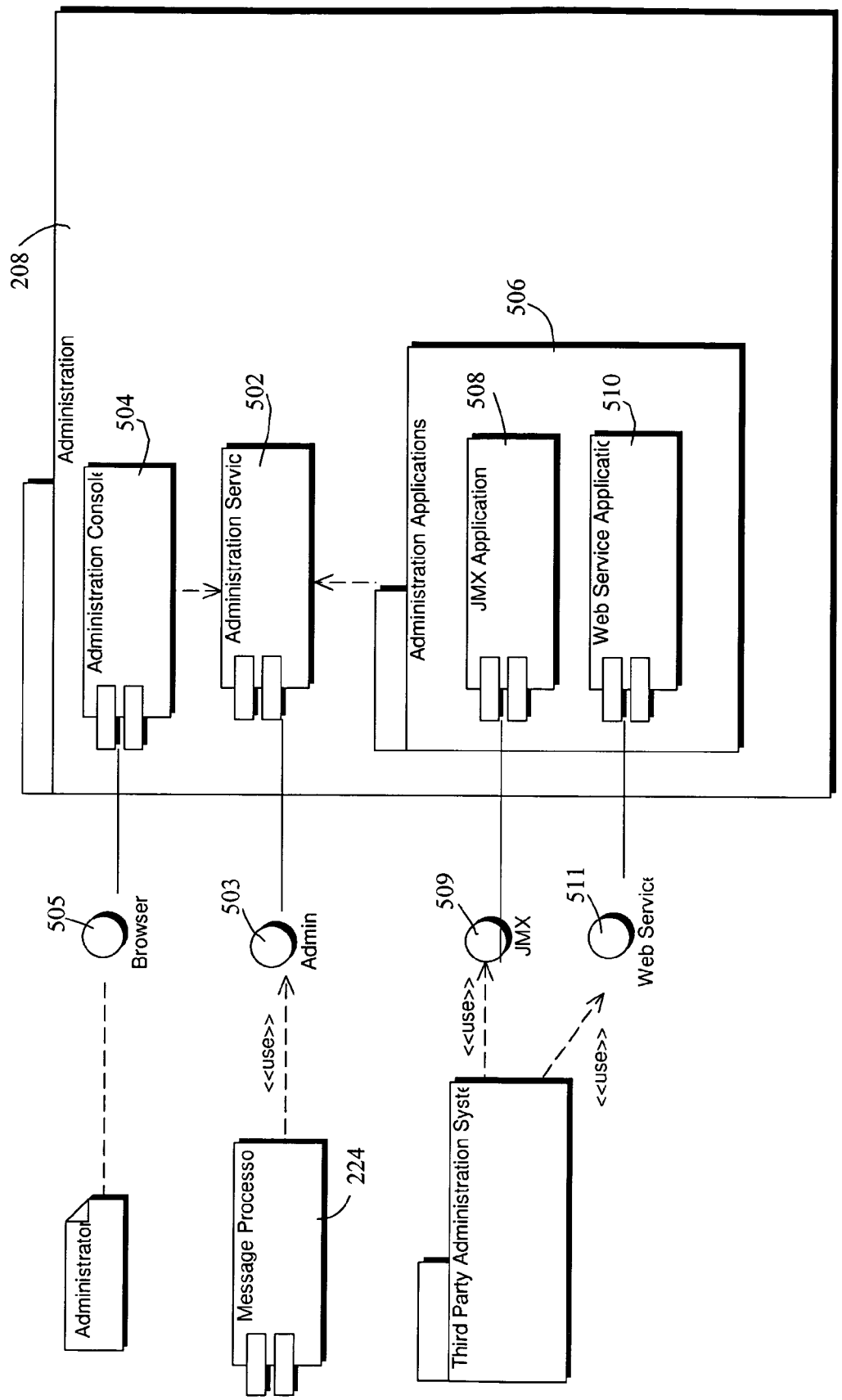
FIG. 5 is block diagram of an administrative subsystem.

The administration subsystem 208 administers system messages, system devices, application gateway subsystems, system diagnostics, and default implementations of the provisioning and discovery services. Referring to FIG. 5, a more detailed view of the administration subsystem 208 is shown. The administration subsystem 208 includes an administration service 502, an administration console 504 and administration applications 506. The administration applications 506 include a Java Management Extension (JMX) application 508 and a web service application 510.

A browser interface 505 couples an administrator with the administrator console 502 for administrating the application gateway 106. An administrator interface 503 couples the administration service 502 with the messaging subsystem 224 for delivering administrative system messages. The administration applications 506 are coupled to their respective third party administrative applications via an appropriate interface. For example, the JMX application 508 is coupled via a JMX interface 509 and the web service application 510 is coupled via a web service interface 511.

The administration service 502 processes component application and runtime environment lifecycle events initiated by the administrator or the lifecycle service providers through the lifecycle administration interface. Examples of such events include installing a component application using push provisioning, refreshing the encryption key, upgrading the component application or runtime components, removing component applications, quarantining component applications and removing component applications from quarantine, applying component application cleanup script, querying the runtime environment for a status update, and updating the client administration policy.

The administration service 502 is also responsible for administration of the wireless devices 102. Accordingly, the administration service 502 is capable of responding to wireless device registration system messages and maintaining wireless device settings such as the security key, mobile data service URL, runtime version and status. The administration service 502 further supports the ability to list devices in accordance with predefined filter characteristics, such as query a device for its component application and runtime environment settings and query for component applications on specific devices.

The administration service 502 also provides the administrator with the ability to access application gateway subsystems runtime information and settings, per cluster node if applicable, and perform system related tasks. Such tasks include viewing the message subsystem 224 runtime information, including message information per wireless device 102 and per component application, as well as the number of messages in queue, and a snapshot of the number of pooled objects of specific type. The administrator is able to modify specific settings at runtime as well as delete or reschedule expired messages.

Other information and settings provided by the administration service 502 includes the following. The application gateway subsystem parameters are available for modification. Therefore, for example, the administrator can enable and disable various features at runtime. Database settings can be configured for a centralized application gateway database. This database may include all of the subsystem depots. The application gateway URLs can be configured to be accessible to external systems. For example, a URL may be assigned to the administration application 506 to allow access by third parties. Also a URL may be assigned to the packaging application to allow access by the provisioning service.

The administration service 502 may also store discovery service credentials, service provider credentials, mobile data service parameters and security parameters. The discovery service credentials can be used to authenticate the discovery service upon receiving a notification message that a component application is available. Similarly, service provider credentials, including its URL, can be used to authenticate a service provider upon receiving component application or runtime environment lifecycle messages. Mobile data service parameters can be used to connect the administrator to the mobile data service and include its IP address, user identification and password. The application gateway security parameters and settings, such as the application gateway public and private key and key refreshing policy, are used for encrypting communication between the application gateway and external applications.

The administration service 502 is also used for registering additional subsystems such as custom connectors and lifecycle listeners, for example.

The web service application 510 uses web services for directing service provider initiated system messages to the administration service 502 for processing and delivery to device, if required.

Similarly, the JMX application 508 directs service provider initiated system messages to the administration service 502 for processing and delivery to device, if required. However, the JMX interface 509 is an open interface that any management system vendor can leverage. The administration infrastructure is based on JMX technology, which is an open technology for system management and monitoring. Each management system implements a set of Mbeans objects in order to be configurable. These objects must be registered with an MbeanServer running in the process space of the object, in accordance with JMX specification.

Since the application gateway 106 can potentially run in a distributed environment, that is some subsystems may run on different application servers, then each application server needs to have its own implementation of the MbeanServer. Further, each subsystem needs to be configured using a separate Administration Console provided by the corresponding application server, or using third party console that knows how to access the functionality provided by MbeanServer.

Messaging Subsystem

The messaging subsystem 224 handles messages that are either system or component application specific. The messaging subsystem 224 is also responsible for the integrity and maintenance of all messages to be delivered by the application gateway 106. Upon receiving a message, the messaging subsystem 224 queues it, optionally stores it (for reliability both to and from the application gateway 106) and prepares it for further delivery to its destination.

Figure 6:
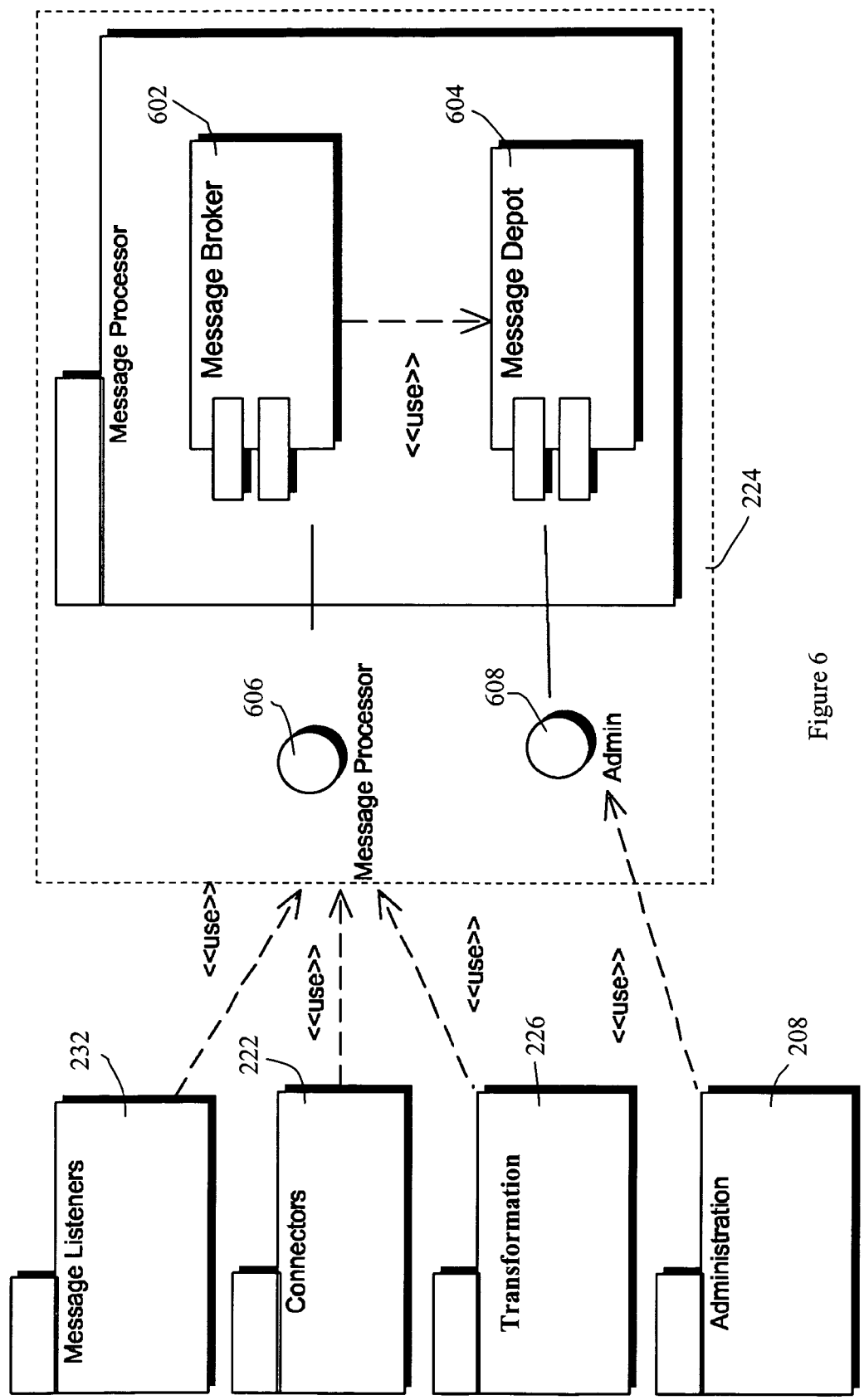
FIG. 6 is a block diagram of a messaging subsystem.

Referring to FIG. 6, the messaging subsystem 224 is shown in greater detail. The messaging subsystem 224 includes a message broker 602 and a message depot 604. A message processor interface 606 couples the message broker 602 with the message listeners 232, the connector subsystem 222, the transformation subsystem 226 and other application gateway subsystems. A message processor administration interface 608 couples the message depot 604 with the administration subsystem 208 and provides an interface to administer and configure the messaging subsystem 224.

The message broker 602 is responsible for validating, processing and forwarding messages in the appropriate format to the proper connector in the connector subsystem. The message broker 602 communicates with the lifecycle subsystem 220 to retrieve information about wireless devices 102 and component applications. If a message mapping targets multiple wireless devices, the message broker 602 creates a message for each wireless device. The message broker 604 further performs scheduled message maintenance jobs. Primarily, this results in removing expired messages. An administrator can schedule the time and frequency of these maintenance jobs via the administration subsystem.

The message broker 602 further manages subscription information and broadcasts messages to all subscribers when notified.

The message depot 604 is used to store information about messages, any information related to reliable mapping, messaging, subscriptions and correlation information.

Transformation Subsystem

The transformation subsystem 226 transforms messages flowing between the wireless devices 102 and application gateway 106 into either an internal message format or a compact message format. The internal message format is convenient for internal subsystems. The compact message format is used for transmission over the air to the wireless device 102 in order to minimize the bandwidth used.

Figure 7:
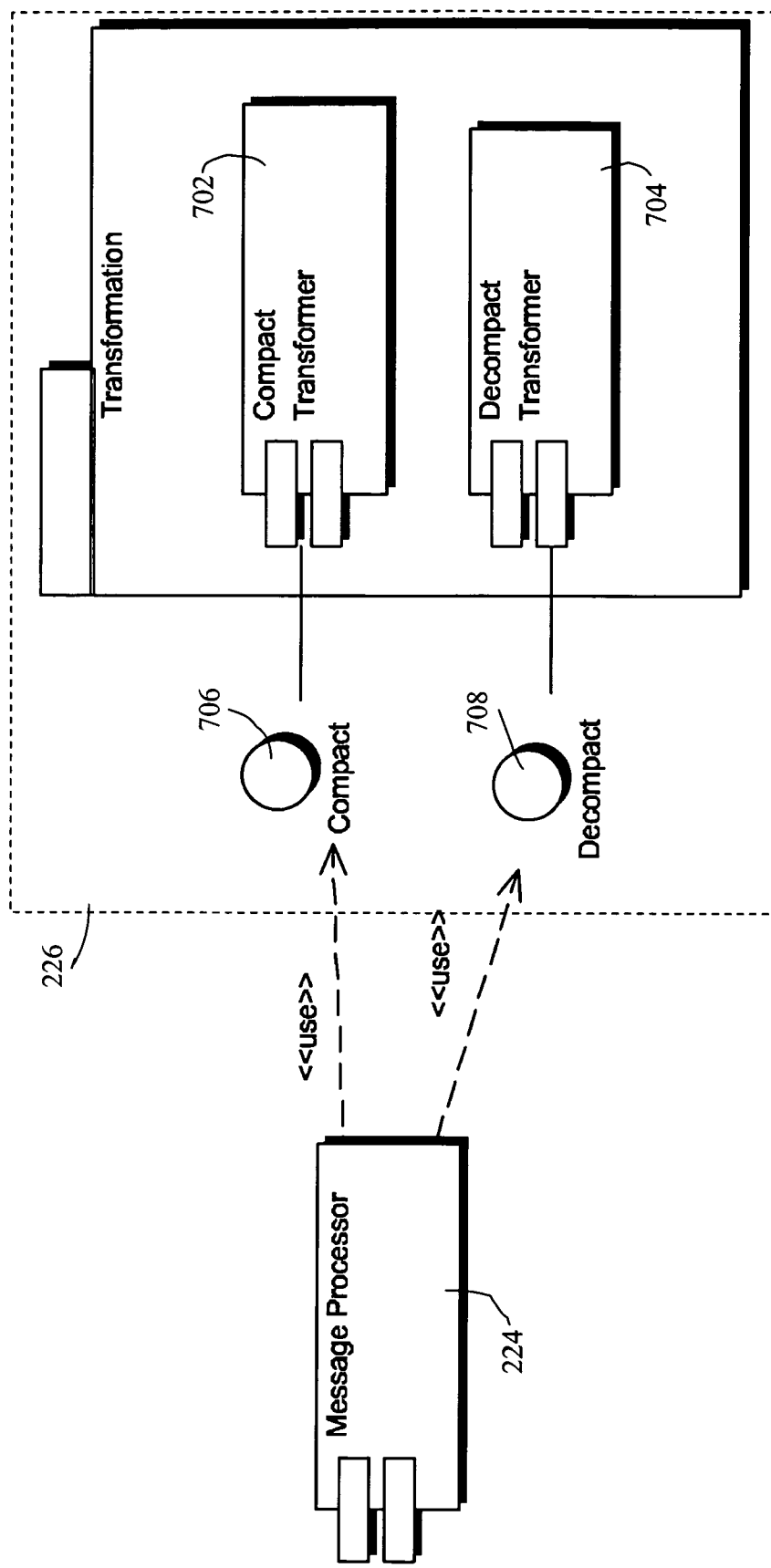
FIG. 7 is a block diagram of a transformation subsystem.

Referring to FIG. 7, the transformation subsystem 226 is shown in greater detail. The transformation subsystem 226 comprises a compact transformer 702 and a decompact transformer 704, each of which communicate with the message subsystem 224 via a compact interface 706 and a decompact interface 708, respectively. When the message subsystem 224 receives a message from an internal subsystem that is destined for a wireless device 102, it is likely that the message will be in the internal message format. Therefore, the message subsystem 224 transforms the message into the compact message format using the compact transformer 702. When the message subsystem 224 receives a message from a wireless device 102 that is destined for an internal subsystem, it is likely that the message will be in the compact message format. Therefore, the message subsystem 224 transforms the message into the internal message format using the decompact transformer 704. It will be apparent to a person of ordinary skill in the art that custom transformers can be added to the transformation subsystem 226 to facilitate custom message formats.

In order to facilitate the transformation, transformer mappings are provided for identifying which transformation needs to occur for a given message destination. It should be noted that a malicious transformer mapping could cause an arbitrary transformation to be performed, which may have negative security implications, such as executing an infinite loop and exhaust system resources. Accordingly, transformer mappings are validated when they are deployed.

Connectors Subsystem

The connector subsystem 222 provides transport services between the application gateway 106 and external destination systems using the required transport protocols. Further, the connector subsystem 222 receives synchronous responses from destination systems, and passes them to the message subsystem 224 for processing.

Figure 8:
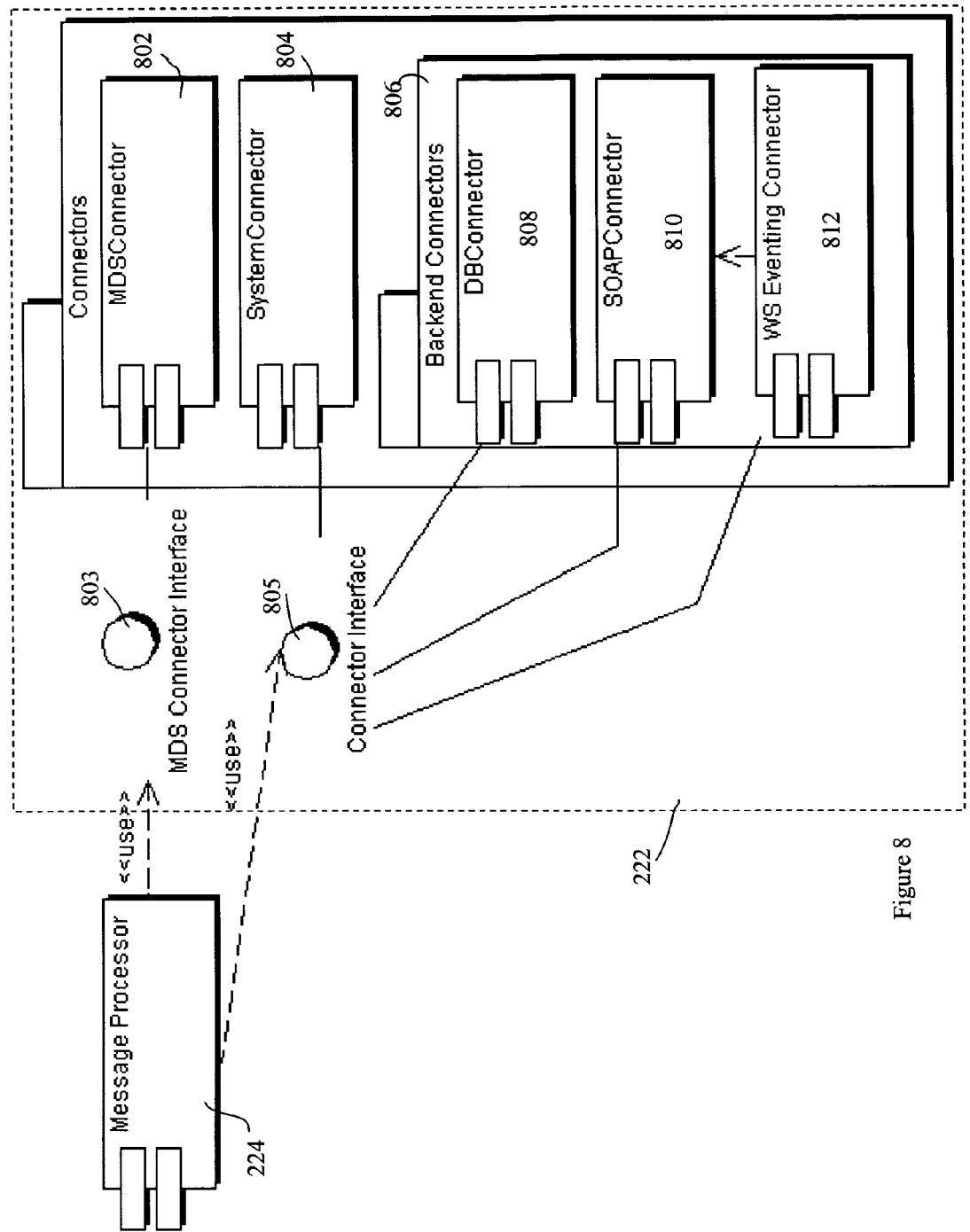
FIG. 8 is a block diagram of a connector subsystem.

Referring to FIG. 8, a more detailed view of the connector subsystem 222 is shown. The connector subsystem 222 includes a MDS connector 802, a system connector 804 and a set of backend connectors 806. The MDS connector 802 is coupled with the message subsystem 224 via a MDS connector interface 803. The system connector 804 and backend connectors 806 are coupled with the message subsystem 224 via a connector interface 805.

The MDS connector interface 803 is a Java API for message delivery to the wireless devices 102 in the compact message format. The connector interface 805 is a Java API for message delivery to internal subsystems or backend systems. The messages are in the internal message format.

The MDS connector 802 delivers compact messages to the wireless device via the MDS 116. The MDS connector 802 works as push initiator to push messages to wireless devices 102. In the present embodiment the MDS connector 802 supports basic push as well as the reliable push to MDS through the Wireless Application Protocol (WAP) to Push (PAP) standard protocol, although other standards can be supported as they are developed.

The system connector 802 delivers system messages to the lifecycle subsystem 220, the administration subsystem 208, or the messaging subsystem 224. Delivery of system messages to any of the specified subsystems is performed by direct API calls. The system connector receives the messages in the internal message format and performs java API calls to the appropriate subsystem.

The backend connectors 806 include several standard connectors, including a database connector 808, a SOAP connector 810 and a WS Eventing connector 812. Further, both the connector interface 805 and the internal message format will be published and, therefore, third party integrators can implement custom backend connectors as required.

The database connector 808 receives messages in the internal message format and transforms them into Structured Query Language (SQL) statements. The database connector 808 then executes the SQL statements against a destination database server through JDBC. Using mapping information defined for each message, the database connector 808 creates a JDBC connection and prepares and/or executes the SQL statements. The database connector 808 receives the query result from the destination database server 108b and passes it back to the messaging subsystem in the internal message format.

The SOAP connector 810 receives messages in the internal message format, transforms them to SOAP format, and delivers the SOAP request messages to backend Web Services 108 using the Web Service SOAP binding over HTTP protocol. Both Remote Procedure Call (RPC)-style and Document-style Web Services are supported. The SOAP connector 810 also receives synchronous SOAP response messages to each request from backend Web Services, transforms the message to the internal message format, and passes it to the messaging subsystem 224.

The SOAP connector 810 further supports encryption of SOAP messages to Web Service backend destinations through the standard HTTPS protocol. It should be noted that end-to-end security could be achieved if both the application gateway and the secure Web Service are deployed behind the same firewall or if the WS-Security protocol is supported.

The WS-Eventing connector 812 is a specialized SOAP connector that supports the WS-Eventing protocol for handling WS-Eventing subscription requests.

Security Subsystem

The security subsystem 212 providing services used by other subsystems for securing communications with the wireless device 102. In order to facilitate secure communications, the security subsystem 212 encrypts and decrypts messages, validates signatures and signs messages.

Figure 9:
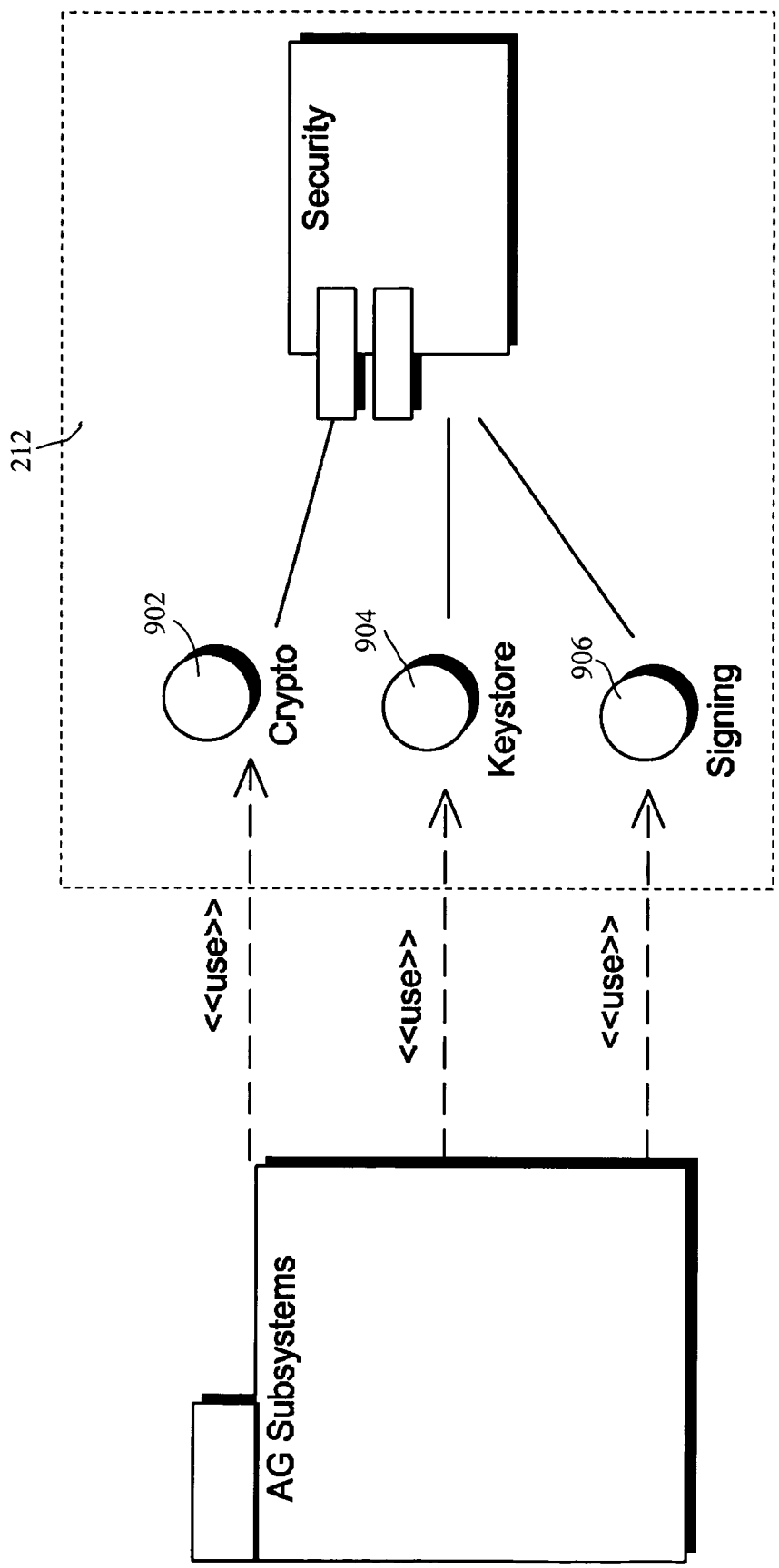
FIG. 9 is a block diagram of a security subsystem.

Referring to FIG. 9, the security subsystem 212 is shown in greater detail. The security subsystem 212 includes a crypto interface 902, a keystore interface 904, and a signature interface 906 for interaction with the subsystems of the application gateway 106. The crypto interface 902 provides functionality allowing encrypting or decrypting messages, received from or sent to the device. The encryption/decryption algorithms are implemented such that the default algorithms can be swapped with new algorithms to change the encryption standards for the whole application gateway 106.

The keystore interface 904 facilitates generating encryption keys and storing and retrieving keys as required.

The signature interface 906 facilitates validating message signatures received as well as signing messages to be transmitted. Similarly to the encryption algorithm, the validation and signature algorithms are can be replaced with different algorithms if desired.

Logging Subsystem

Figure 10:
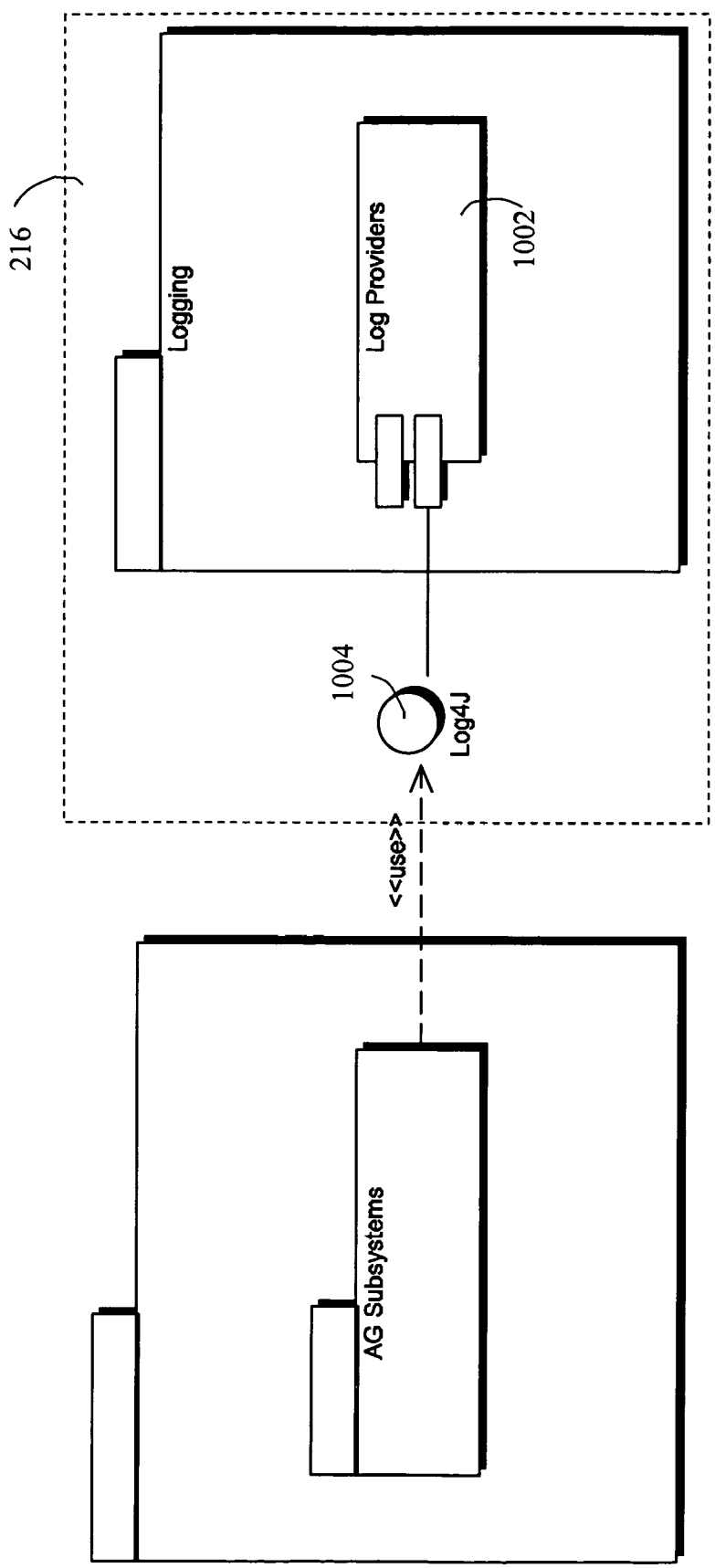
FIG. 10 is a block diagram of a logging subsystem.

Referring to FIG. 10, the logging subsystem is shown in greater detail. The logging subsystem 216 delegates system log messages to a variety of logging providers 1002, including a console log provider, a file log provider, a database log provider, and an electronic mail (email) log provider. The log providers may be either internal or external to the gateway server. The logging subsystem 216 further allows system wide logging via a log4J interface 1004. Further, as will be appreciated by a person of ordinary skill in the art, additional custom logging providers may be added as required.

Configuration Subsystem

Figure 11:
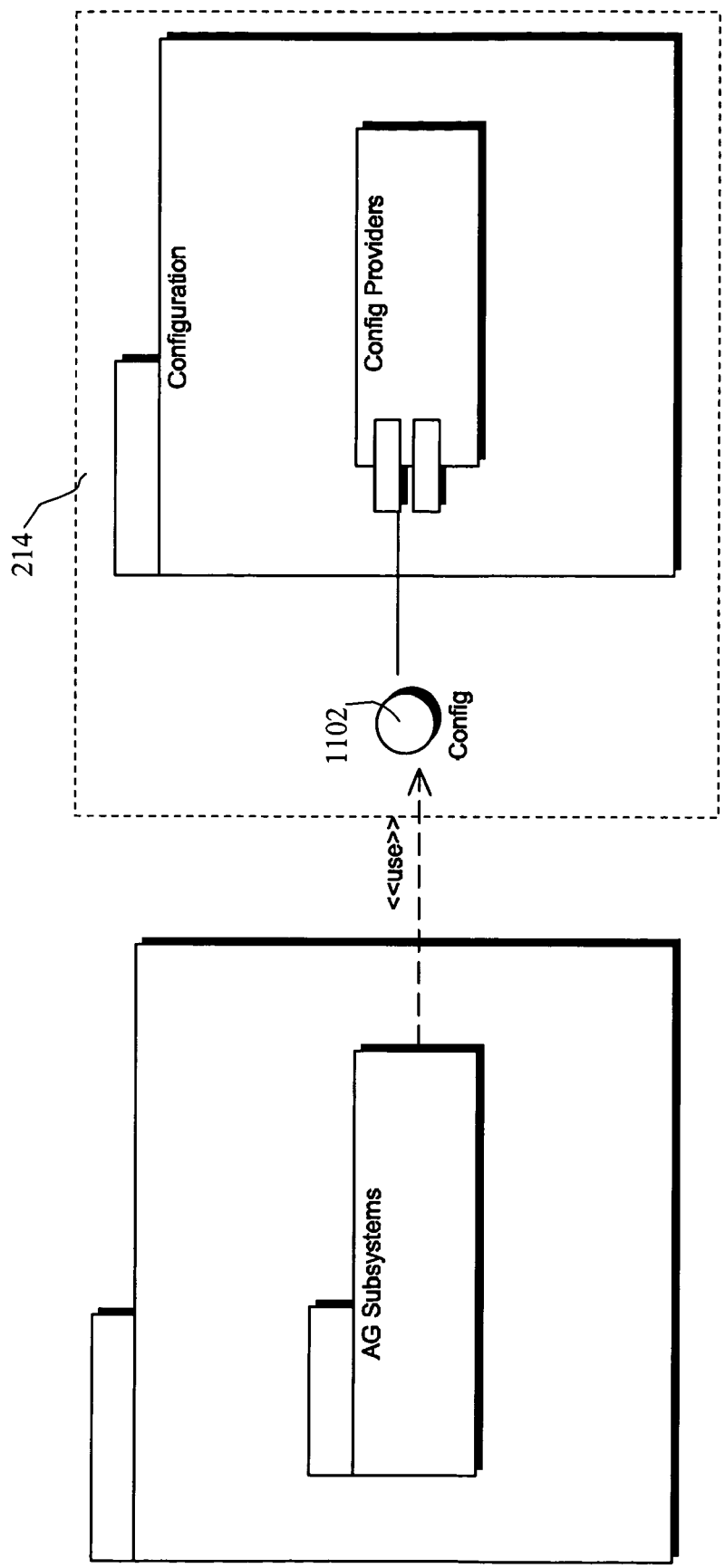
FIG. 11 is a block diagram of a configuration subsystem.

The configuration subsystem 214 provides the application gateway subsystems with access read-only configuration parameters that are used for bootstrapping and application gateway system initialization. Referring to FIG. 11, the configuration subsystem 214 includes a configuration interface 1102 for providing a single point of access configuration for the application gateway subsystems.

Utilities Subsystem

Figure 12:
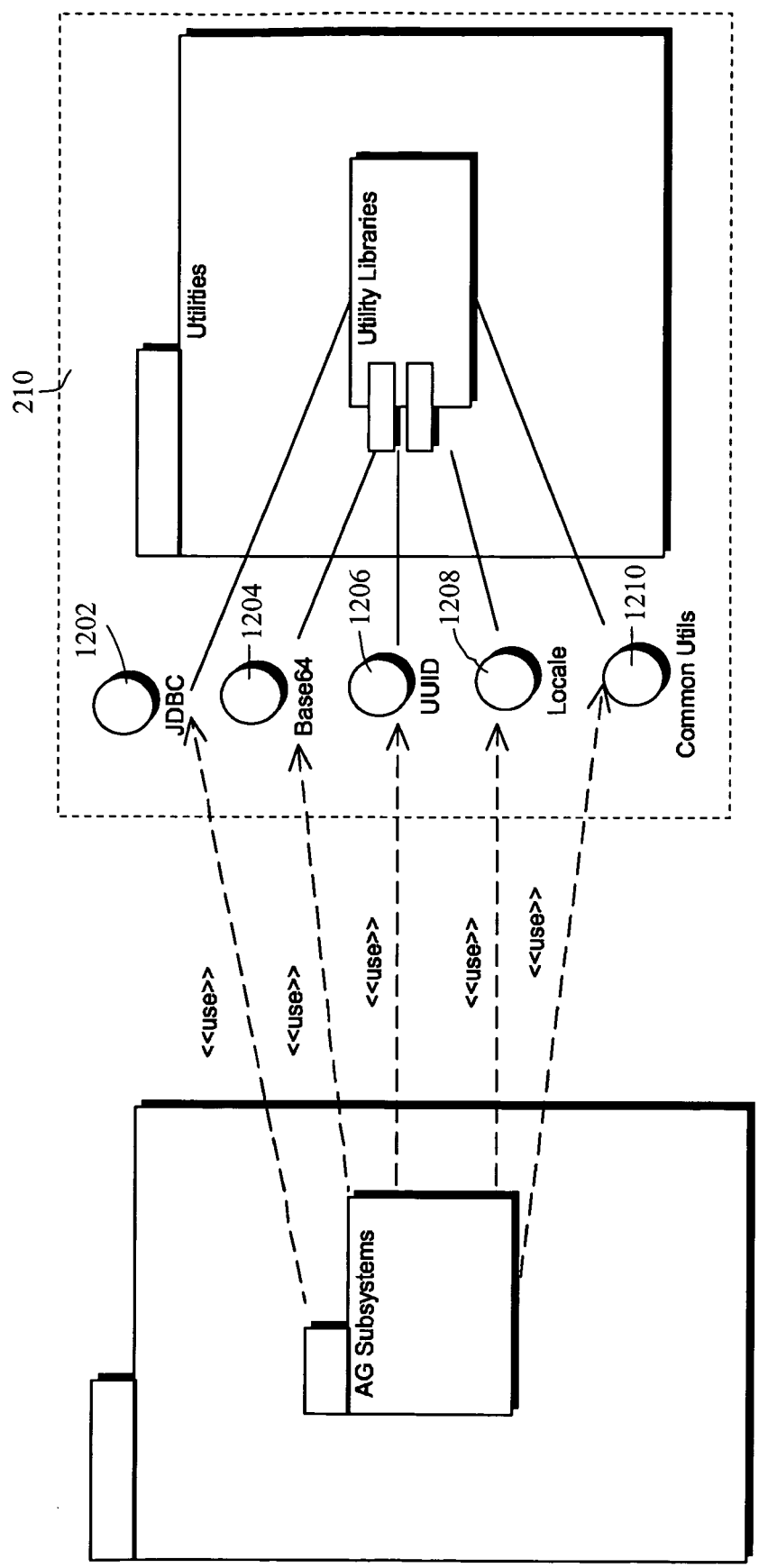
FIG. 12 is a block diagram of a utilities subsystem.

The utilities subsystem 210 provides a set of standards based libraries and interfaces for performing base layer services in a uniform fashion. It is responsible for providing stateless reusable sets of code to be used consistently in all of the subsystems. Referring to FIG. 12, the utilities subsystem 210 includes a JDBC interface 1202, a Base64 interface 1204, a Universal Unique Identifier (UUID) interface 1206, a locale interface 1208, and a common interface 1210 for coupling the utilities subsystem 210 with other application gateway subsystems. The JDBC interface 1202 provides a utility for connection creation from a common configured data source. The Base64 interface 1204 provides a utility for encoding binary encoded data. The UUID interface 1206 provides a utility for creating system unique identifiers. The common interface 1210 provides any other common functional libraries required. As will be appreciated by a person of ordinary skill in the art, other interfaces or libraries may be added as required.

Packaging Application

The packaging application is provided as part of the application 230 for facilitating provisioning of component applications on the wireless devices 102. During a first request for a component application package, the packaging application processes a raw component application, also referred to as a component application bundle, and prepares it for wireless transmission. The packaging application loads the component application bundle from a specified location, typically a predefined URL, determines what security actions and processing it needs to perform, and returns a packaged component application to the provisioning service for storage.

Security actions that may need to occur include, for example, authentication of the component application bundle publisher. Authentication can be achieved by verifying the validity of the publisher's certificate and the using the application gateway signature to sign the packaged component application. Further, studio tools produced IDE Tag certificates are verified.

The component application bundle typically includes modules such as XML definitions, mappings, application resources, and resource bundles for localization support. The XML definitions include XML coding of application data, messages, screen components and workflow. XML is used as an example of any structured definition language applicable to coding of the component applications.

The mappings define the relationship between the component application and one or more backend servers 108. In the present embodiment, the mapping is defined using the Web Services Description Language (WSDL). WSDL is defined in the standard as an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate, however, the only bindings described in this document describe how to use WSDL in conjunction with SOAP, HTTP, and Multi-Purpose Internet Mail Extensions (MIME).

Accordingly, when a message is received from the wireless device 102, it includes an identifier illustrating the component application from which it originated. This information is used to identify a corresponding mapping, which determines how to interpret the message as well as where to send it. In the present embodiment, each wireless device 102 is uniquely addressable. Accordingly, return messages are pushed to the device via the mobile data server 116. In alternate embodiments, the push can be achieved via other known carrier/device specific push protocols, as will be appreciated by a person skilled in the art. For example, a Wireless Area Protocol (WAP) push performed over Short Message System (SMS).

The application resources include one or more resources such as images, sound, video and the like, that are packaged with the application as static dependencies. The resource bundles typically include localization information for the component application. An example of localization information includes language support, text direction, scrolling directions, dictionary and thesaurus services and the like.

Accordingly, the processing of the component application bundle includes localization using the provided resource bundle, binary encoding, marking the component application with a secure flag and uploading the packaged component application in a provided destination repository, which is typically defined by URL. In the present embodiment, the binary encoding is performed for reducing the bandwidth required for transmitting the component application to the wireless device 102. The binary encoding is achieved using the Wireless Area Protocol Binary XML (WBXML) standard, although other coding schemes may be used. Yet further, it may not be required to perform binary encoding at all. Further, the mapping is transmitted to the message broker 602 for facilitating communication between the runtime environment executing the component application and the associate backend server or servers 108.

The packaging application is available to external subsystems as a web service. In the present embodiment, it is accessed by the provisioning service 120, but it may also be accessed by third party custom provisioning services.

Discovery Server

Figure 13:
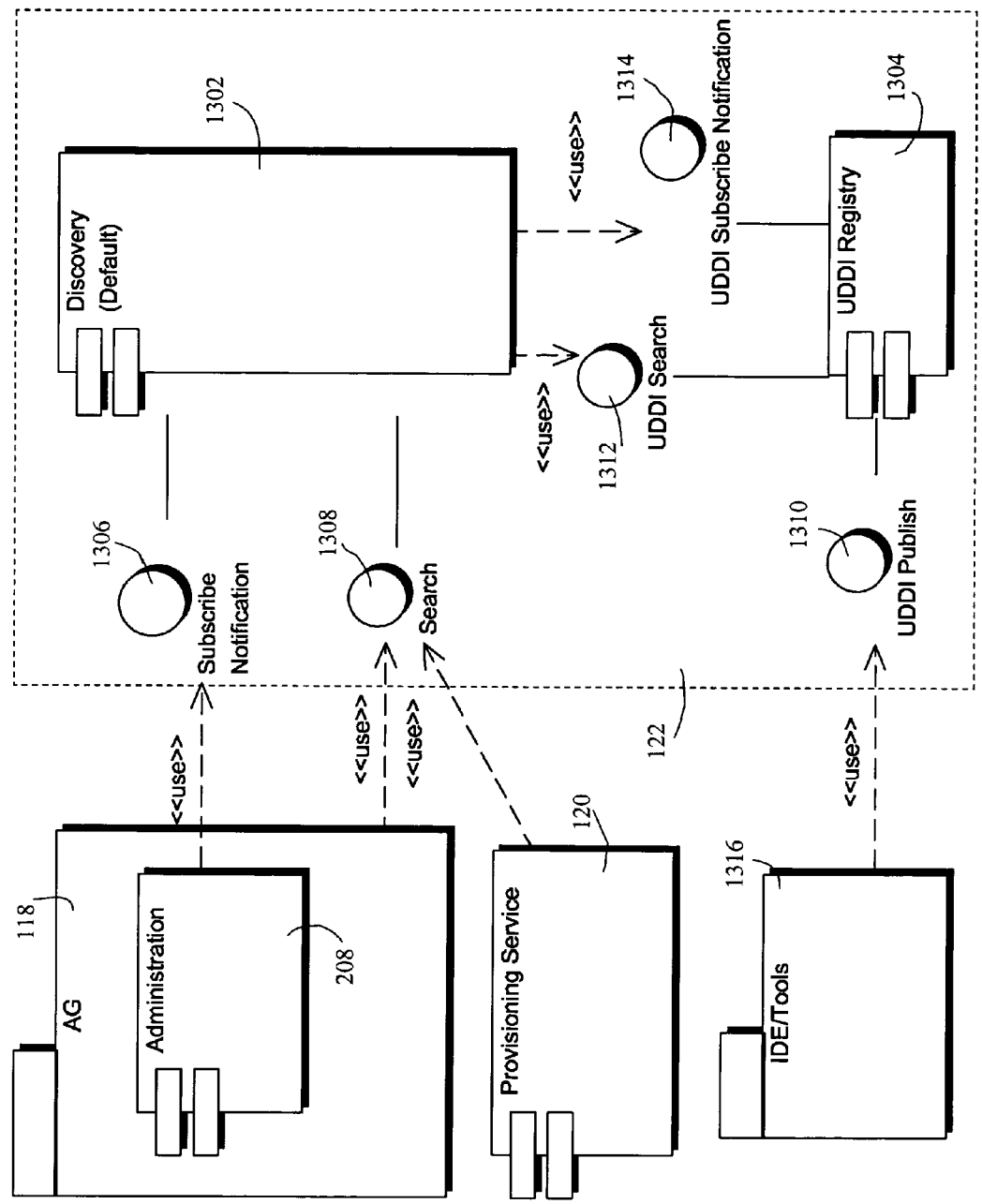
FIG. 13 is a block diagram of a discovery server.

Referring to FIG. 13, the discovery server 122 is shown in greater detail. The discover server 122 comprises a discovery service 1302 and a Universal Description, Discovery and Integration (UDDI) registry 1304. The discovery service 1302 communicates with the UDDI registry 1304 via a UDDI search interface 1312 and a UDDI subscription notification interface 1314. The discovery service 1302 further communicates with the administration subsystem server 108 via a subscription notification interface 1306, and with both the application gateway server 118 and the provisioning server 120 via a search interface 1308. The UDDI registry 1304 is in communication with an integrated development enterprise 1316 via a UDDI publish interface 1310.

The UDDI publish interface 1310 is a SOAP based UDDI interface providing publishing capabilities. This interface is used by any utility that facilitates component application publishing. Accordingly, once a developer has created a component application, it can be submitted to the UDDI registry 1304 by following a set of component application publication rules.

The discovery service 1302 can request a notification of new or updated component applications registered with the UDDI registry 1304. The UDDI subscription notification interface 1314 is a SOAP based UDDI interface provided by UDDI registry to subscribe for Registry notifications. The support for notification is based on the UDDI v3.0 specification.

The UDDI search interface 1312 provides a SOAP based UDDI interface for searching the UDDI registry.

The default implementation of the discovery service 1302 is a standalone Web Service deployed as part of the application gateway 106 via the discovery server 122. The discovery service 1302 offers local component application discovery services to a discovery component application on the runtime environment on the wireless devices 102. From the perspective of the application gateway server 118, the discovery service 1302 is a typical component application, and is deployed and managed as such. Accordingly, processing of discovery messages is generic and transparent to the application gateway server. Thus, the application gateway server 118 serves as a message broker between the runtime environment and the discovery service 1302.

Typically, the runtime environment communicates with the discovery service 1302 through the search interface 1308. The current search interface 1308 may be replaced with another one, as long as both the discovery component application on the wireless device and the discovery service 1302 support it.

Yet further, the default implementation of the discovery service 1302 may be used to enforce the secure wireless component provisioning policy. The security is achieved since the discovery service 1302 accesses only predefined local or trusted UDDI registries.

Similarly to the UDDI subscription notification interface 1314, the subscription notification interface 1306 is a SOAP based interface implemented by the discovery service provider 122. It allows the administration subsystem 108 to subscribe for discovery notifications. Such notifications include, for example, 'new component application version is available' and 'new component application is available'.

Provisioning Server

Figure 14:
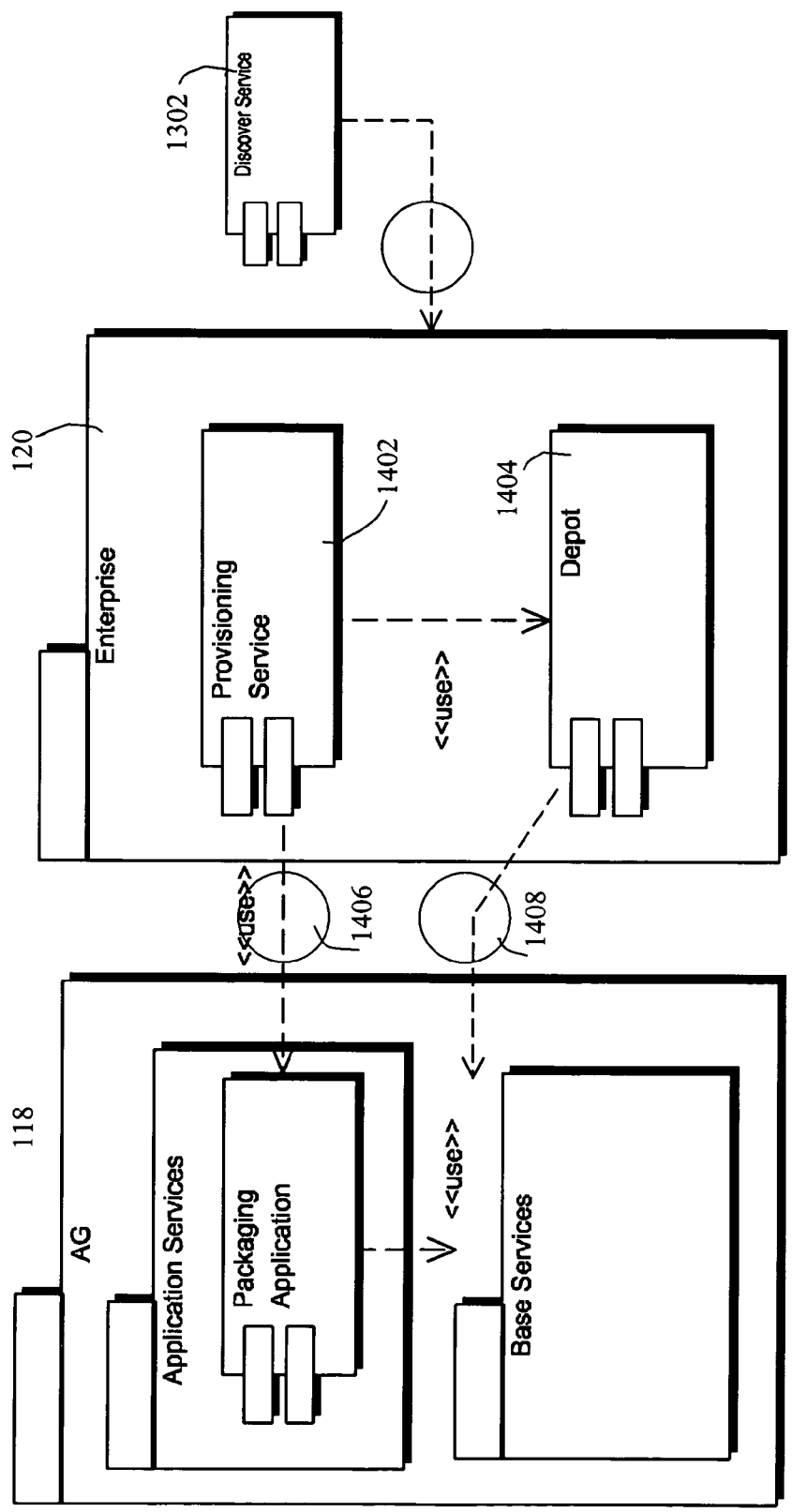
FIG. 14 is a block diagram of a provisioning server.

Referring to FIG. 14, the provisioning server 120 is shown in greater detail. The provisioning server 120 comprises a provisioning service 1402, a component application depot 1404, a provisioning interface 1406 and a packaging interface 1408.

The provisioning service 1402 can create, retrieve, update and delete component application packages. The provisioning service 1402 services component application provisioning requests initiated on the mobile device 102 via the provisioning interface 1406. If the component application has been packaged, the provisioning service returns the location of the packaged component application.

If the component application has not been packaged, the provisioning service 1402 communicates with the discovery service 1302 for locating the requested component application. The location of the component application is returned to the provisioning service 1402, which communicates a packaging request to the packaging application via the packaging interface 1408. A packaged component application is returned to the provisioning service 1402 for storage in the component application depot 1404. The provisioning service 1402 then returns the location of the packaged component application.

System Operation

The operation of the application gateway 106 is described as follows. Initially, the general message processing operation will be described, followed by component application provisioning and other specific functions of the application gateway 106.

Figure 15:
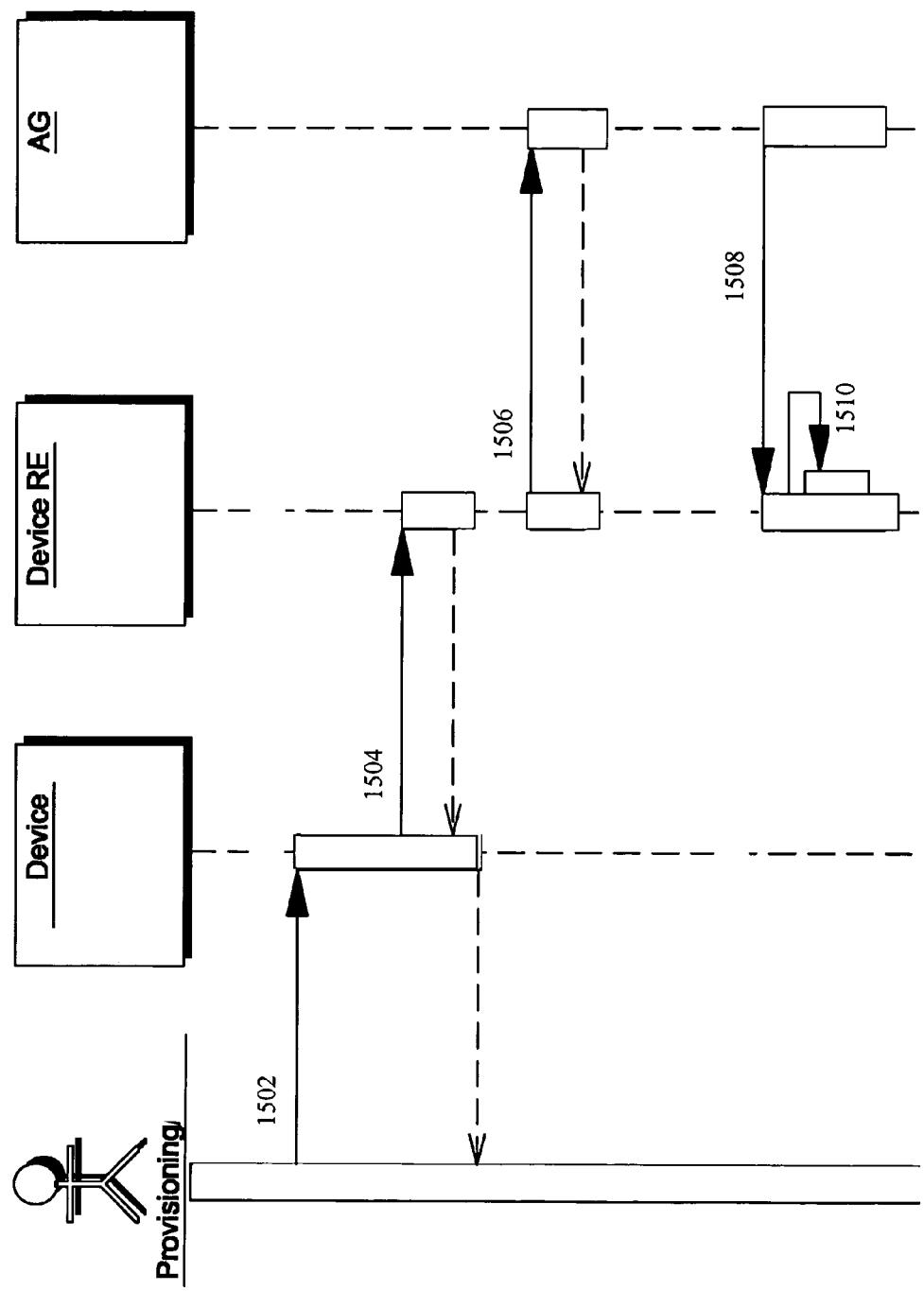
FIG. 15 is a flow diagram illustrating runtime initialization.

Referring to FIG. 15, an example of runtime initialization is illustrated generally by numeral x00. In step 1502, the service book is loaded to the wireless device. As previously described, the service book may be pushed to the wireless device by the MDS 116 or enterprise server 114 or it may be loaded by an administrator using a local, wired connector. In step 1504, the wireless device 102 notifies the runtime environment that it has received the service book. The runtime environment acknowledges the notification to the wireless device 102, which in turn acknowledges the response to the service that initially pushed the service book.

In step 1506, the runtime environment sends a registration message to the URL specified in the service book to register itself with the application gateway 106. The registration message includes wireless device identification information and system information, such as the runtime environment version, and the like. The application gateway 106 registers the device by recording pertinent information in the lifecycle subsystem 220 and the administration service 208, and acknowledges the registration message.

In step 1508, the application gateway 206 transmits a user administration profile and default component application administration profile to the runtime environment and in step 1510 the profiles are stored by the runtime environment. The user administration profile defines end user privileges as well as domain related settings for the wireless device 102. It contains information such as whether or not to allow untrusted component applications on the wireless device 102, whether or not to allow 'silent' push provisioning and whether or not to allow user initiated provisioning. Silent push provisioning refers to a component being pushed by the administrator to the wireless device without the user's knowledge.

The component application administration profile describes component application runtime parameters such as the component application's rights to access other applications on the wireless device 102, an allocated storage limit, and a queue threshold. The component application administration profile is typically defined by the administrator and is used and enforced by the runtime environment. Typically there are different default profiles for trusted and untrusted component applications.

Once the wireless device 102 is registered with the application gateway 106, it can begin to request provisioning of component applications. That is, the wireless device 102 will request that specific component applications be installed. Generally, there are three methods for determining which component applications are to be provisioned: request from the user, push from the administrator, and push from a third party or service provider.

In the present embodiment, the primary difference between these methods is how a deployment descriptor is obtained. The deployment descriptor includes information such as the component application name, version, description and location. The description may optionally include which languages are supported by the application. Once the deployment descriptor has been obtained the actual provisioning processes for the three methods are very similar.

Figure 16:
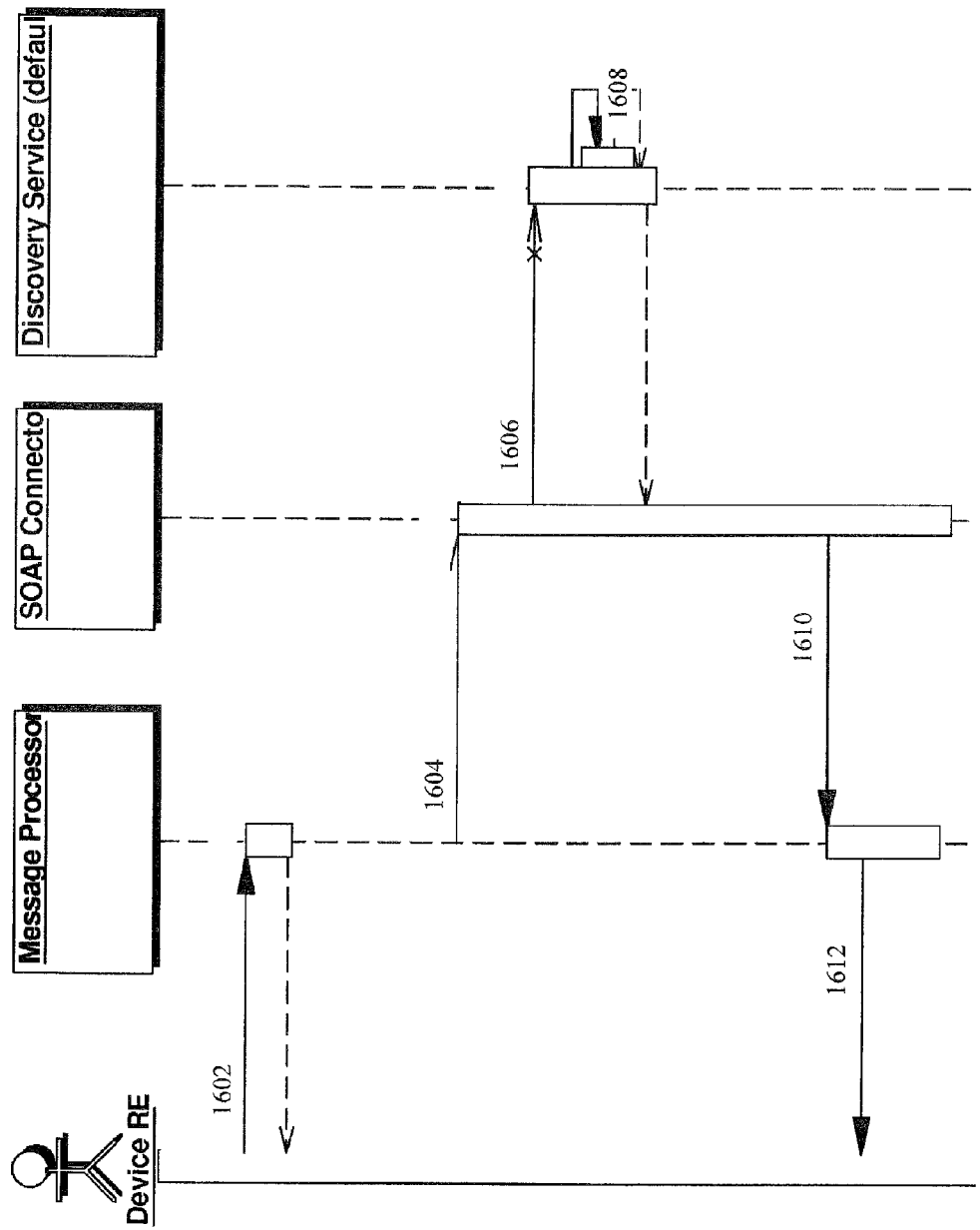
FIG. 16 is a flow diagram illustrating discovery in response to a user request.

Referring to FIG. 16, an example of a user requesting that component application be provisioned is illustrated. In step 1602, the device runtime transmits a compact message to the application gateway server 118. The details of the message flow are described with reference to FIG. 21. For the present example, it is sufficient to understand that the message subsystem 224 receives the compact message and, in step 1604, delivers an internal message to the connector subsystem 222. In step 1606, the SOAP connector 810 delivers a search request to the discovery service 1302. In step 1608, the discovery service 1304 searches the UDDI registry 1304 for the required component application and returns a result.

In the present embodiment, the result is the deployment descriptor, however the result may also be a URL to the deployment descriptor or other way of addressing it. In step 1610 the result is returned from the SOAP connector 810 to the message subsystem 224 in internal message format. In step 1612, the message subsystem 224 returns the result to the device runtime.

Figure 17:
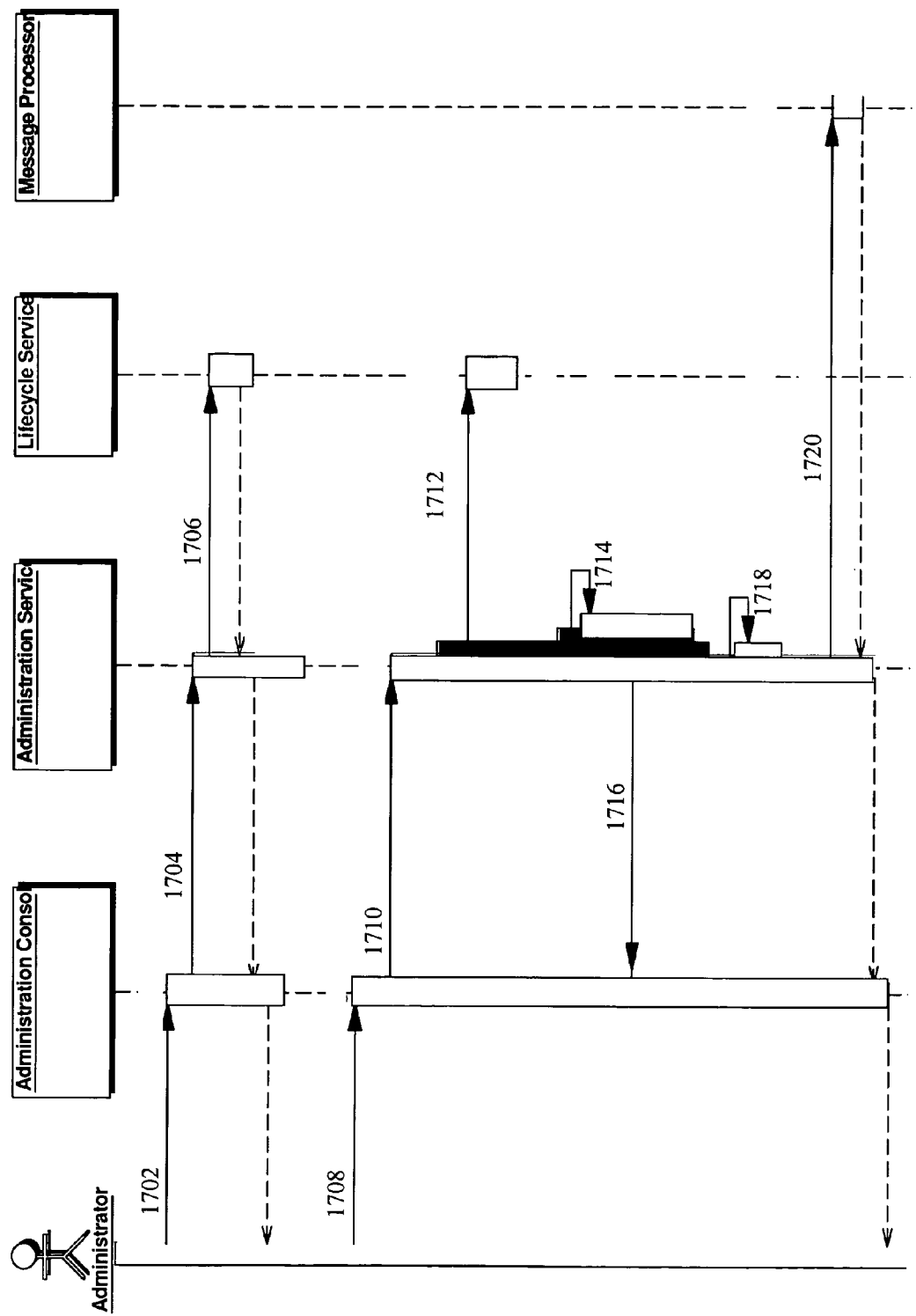
FIG. 17 is a flow diagram illustrating discovery in response to a push from an administrator.

Referring to FIG. 17, an example of push provisioning a component application from the administration service 208 to the wireless device 102 is illustrated. In step 1702, the administrator prepares a wireless device parameter list for push provisioning and enters it using the administration console 504. In step 1704, the administration console 504 communicates the list to the administration service 502. In step 1706, the administration service 502 queries the lifecycle subsystem 220 for obtaining a list of wireless devices that conform the administrator's parameters. The results are returned up the chain back to the administrator.

In step 1708, the administrator uses the list of wireless devices for pushing a deployment descriptor. The list of devices and the deployment descriptor is entered in the administration console 504. In step 1710, the administration console 504 communicates the list and the deployment descriptor to the administration service 502. In step 1712, the runtime environment for each device in the list is retrieved from the lifecycle subsystem 220. In step 1714 the device runtime environment version is checked with the runtime environment version required for the component application to be provisioned. The runtime environment version required for the component application can be communicated in several ways. In the present embodiment, it is included in the deployment descriptor. In an alternate embodiment, it may be retrieved from the component application bundle when required. If it is determined that the runtime environment and the component application are incompatible with each other, a failure message is generated. In step 1716, the failure message is transmitting to the administration console 504.

In step 1718, for all devices that are determined to have compatible runtime environments, an "Upgrade Required" or "New Application Available" message, including the deployment descriptor, is constructed and in step 1720 it is delivered to the associated wireless devices 102. A task delivery is detailed in FIG. 26.

Figure 18:
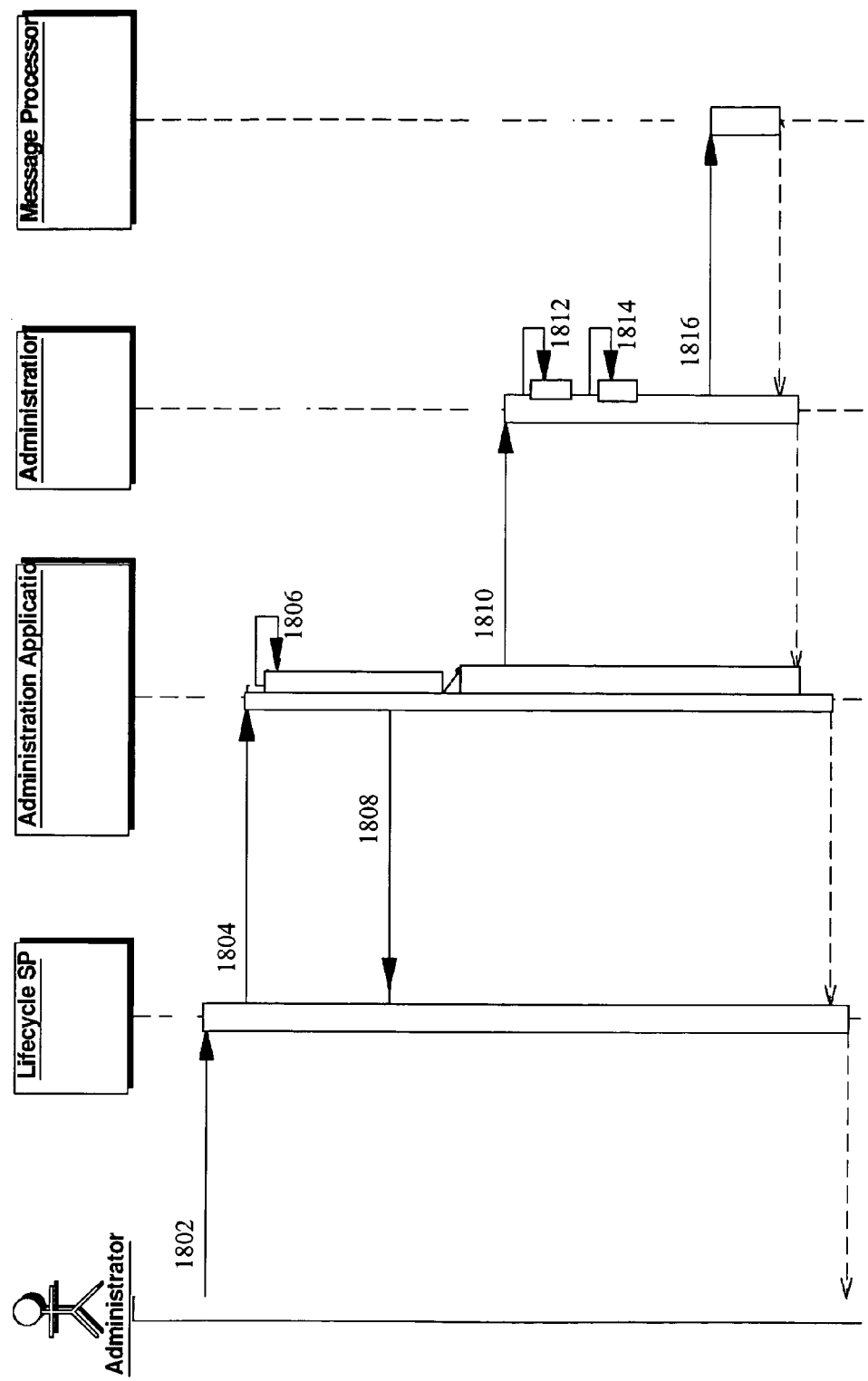
FIG. 18 is a flow diagram illustrating discovery in response to a push from a service provider.

Referring to FIG. 18, an example of push provisioning a component application from the service provider for the wireless device 102 is illustrated. In step 1802, an administrator of the service provider initiates a request to the lifecycle service provider for a component application push. The request includes parameters for a plurality of wireless devices and the deployment description of the component application. In step 1804, the lifecycle service provider retrieves the wireless device information, for example the wireless device identifier and runtime version, and transmits it, along with the deployment descriptor, to the administration application.

In step 1806, the administration application authenticates the lifecycle service provider. If the authentication fails, then in step 1808, the administration service 502 reports the failure to the lifecycle service provider. Otherwise, in step 1810 the administration application sends the received information to the administration service 502. In step 1812, the administration service 502 verifies that the runtime environment version of the device is compatible with the component application. In step 1814, for all devices that have a runtime environment that is compatible with the component application, an "Upgrade Required" or "New Application Available" system message is constructed. In step 1816, the system message is delivered to the wireless devices 102.

Figure 19:
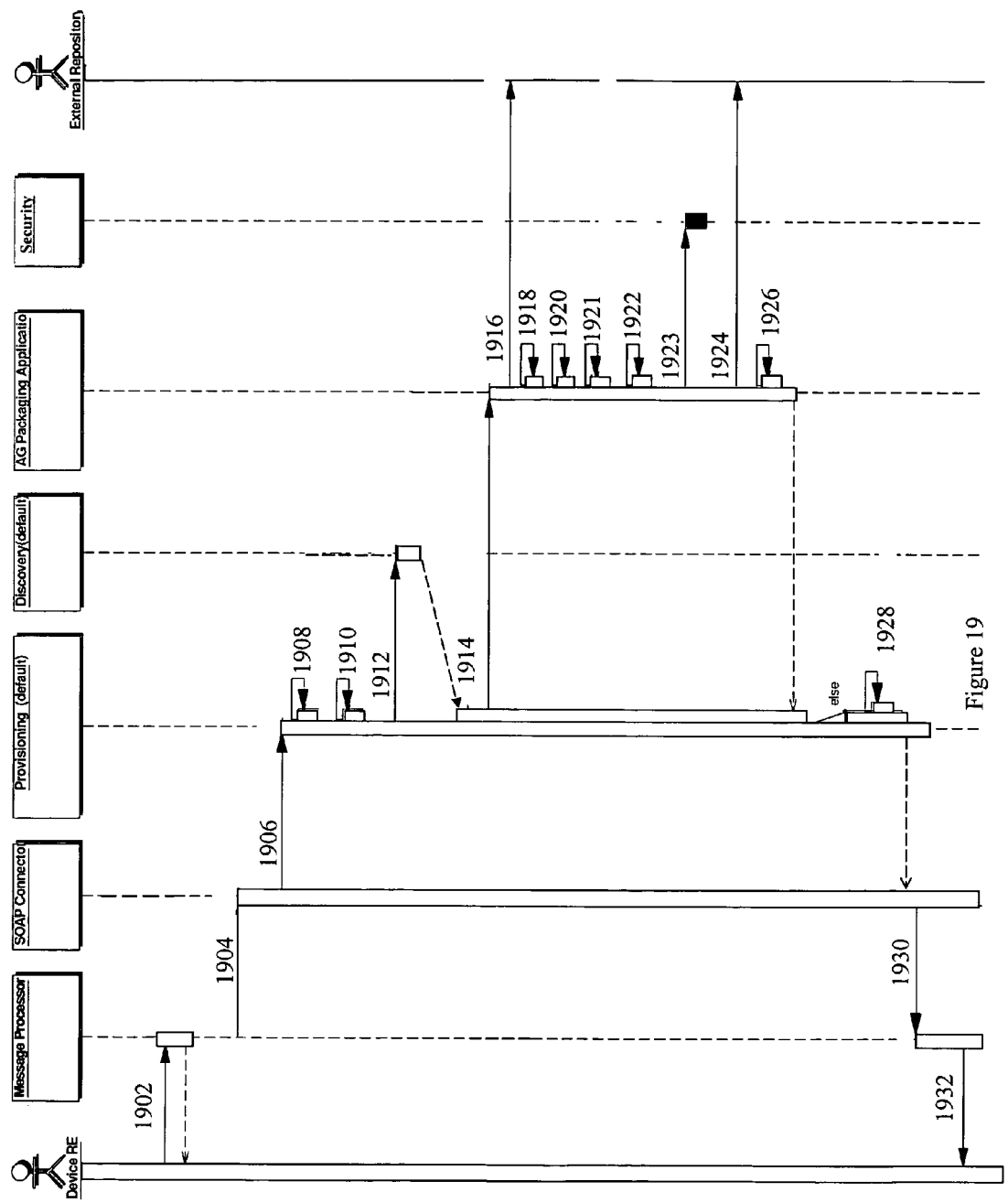
FIG. 19 is a flow diagram illustrating provisioning of a component application.

Once the wireless device 102 has received the deployment descriptor for the component application to be provisioned, the wireless device 102 can proceed to retrieve the component application. Referring to FIG. 19, an example of provisioning a component application for a wireless device is illustrated. If the user administration profile on the wireless device 102 allows silent provisioning, then the runtime environment automatically proceeds to step 1902. If, however, the user administration profile on the wireless device 102 does not allow silent provisioning, the runtime environment will not proceed to step 1902 until instructed by the user.

In step 1902, the runtime environment transmits a message to the application gateway 106. The message includes a deployment descriptor and an indication of the desire to retrieve a component application. The message is received at the application gateway 106 by the application gateway server 118 and sent to the messaging subsystem 224.

In step 1904, the messaging subsystem 224 sends the message to the SOAP connector 810. In step 1906, the SOAP connector transmits the request to the provisioning server 120. In step 1908, the provisioning server 120 checks to see if the component application has already been packaged in the desired format. In step 1910, the provisioning server 120 validates the component application certificate is valid. In step 1912, the provisioning server 120 queries the discovery server 122 to determine if it has the packaged component application.

If the component application has already been packaged, the process skips to step 1928. In step 1914, it is determined that the component application has not yet been packaged and a request is sent to the packaging application. In step 1916, the packaging application retrieves the raw component application from the URL provided by the deployment descriptor. In step 1918, the raw component application is localized using the provided resource bundle. In step 1920, the localized component application is binary encoded in accordance with a Document Type Definition (DTD) within the bundle. In step 1921, the packing application attempts to provide a unique identifier for the application by hashing its identifier, assigned by a developer, with a timestamp. The results of the hash are compared with a list of know application identifiers for verifying that it is unique. If it is not, the combination is rehashed, either with a different hashing algorithm or a different timestamp. The process is repeated until a unique identifier is obtained or a maximum number of attempts have been exhausted. In step 1922, the packaging application determines whether or not the component application requires a dedicated server. If it does not require a dedicated server or the dedicated server is the application gateway server 106, the packaging application loads the mapping to the message broker 206. If the dedicated server is an external server, either the mapping is exported to the external server or it is assumed that the external server has the required mapping. Alternately, the mapping may be deployed when the runtime environment acknowledges installation of the application, as described with reference to FIG. 20. In step 1923, the encoded component application is signed with the application gateway's encryption key and in step 1924, the signed component application is uploaded to a destination URL provided by the provisioning server 120. In step 1926, the packaging application sets a trusted flag in its response to the provisioning system 120, indicating that the component application has been packaged and signed.

In step 1928, the location of the packaged component application is retrieved by the provisioning service 120. In step 1930, the component application location and the trusted flag are returned to the message processor 224 via the SOAP connector 224. In step 1932, the message processor transmits the message to the wireless device indicating that the component application has been provisioned.

In the examples described above, the request for component application provisioning is sent from the wireless device 102. However, this need not be true in all cases. For example, for push provisioning it is possible to obtain the deployment descriptor and request provisioning without communicating with the wireless device 102. For such an embodiment, the application gateway 106 would have to have knowledge of whether silent push provisioning is allowed for the wireless device 102. If silent push provisioning is allowed, the application gateway can proceed to provision the component application. If silent push provisioning is not allowed, the wireless device 102 needs to be notified prior to provisioning the component application in order to obtain instruction from the user.

Figure 20:
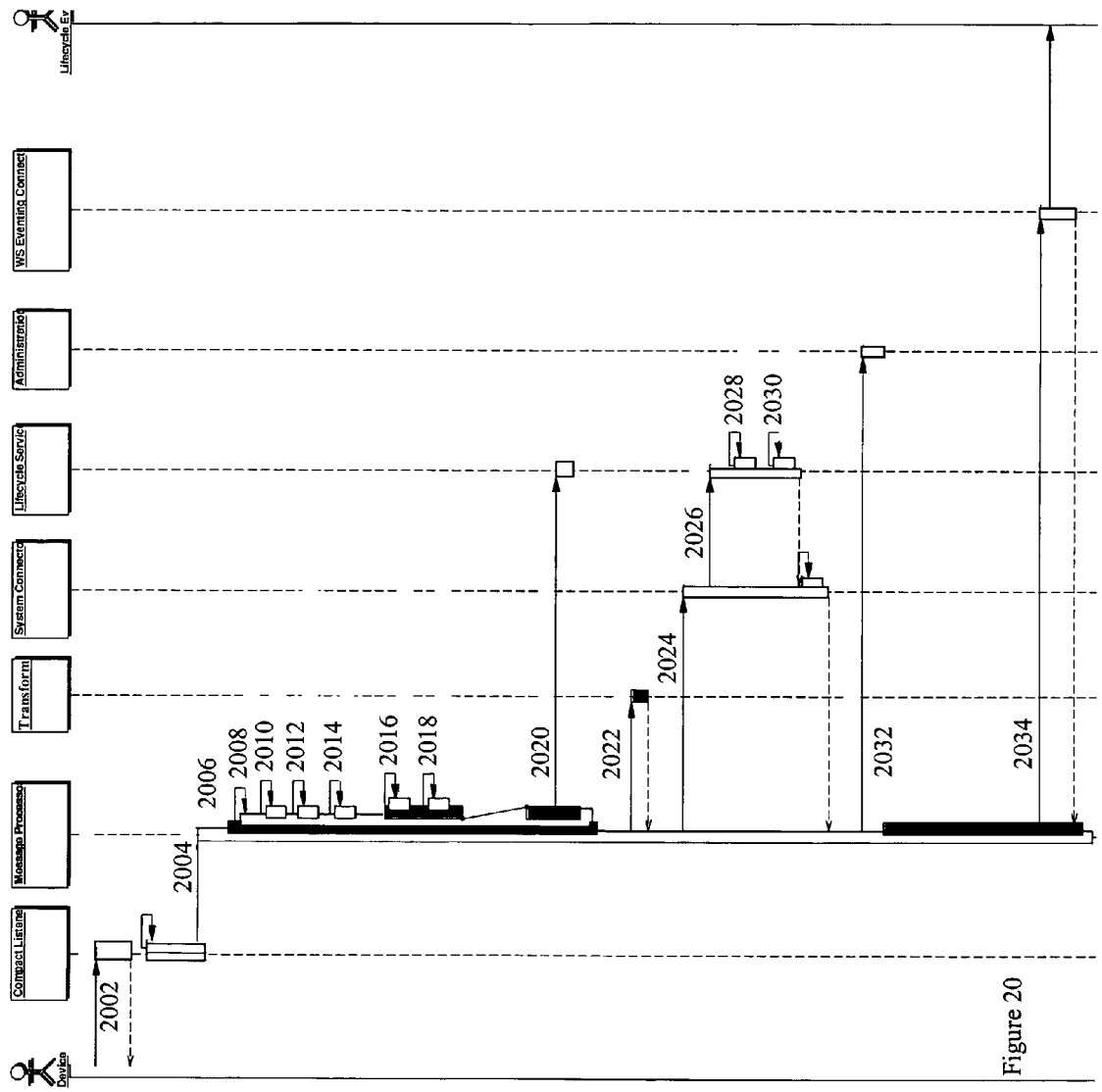
FIG. 20 is a flow diagram illustrating acknowledgment of component application installation.

Once the wireless device receives the message, the component application can be retrieved and compiled by the runtime environment. Further, the runtime environment acknowledges installation of the component application to the application gateway 106. Referring to FIG. 20, an example of what happens in response to an acknowledgement message is illustrated. In step 2002, the wireless device 102 sends an acknowledgement message to the application gateway 106. The acknowledgement message includes the component application URL, the packaged component application URL, and a flag indicating that component application has been successfully installed.

In step 2004, the acknowledgement message is received by the compact listener, which forwards the information to the messaging subsystem 224. In step 2006, it is determined whether or not a mapping has been deployed. If the mapping has been deployed, the process continues at step 2022. In step 2008 the mapping has not yet been deployed, so the messaging subsystem 224 completes the component application provisioning as follows. In step 2010, the messaging subsystem 224 retrieves the packaged component application. In step 2012, the WSDL portion is retrieved, and in step 2014 the messaging subsystem 224 determines whether or not the WSDL portion of the packaged component application is still valid.

If the WSDL portion is invalid, the process continues at step 2020 wherein a message is sent to the lifecycle subsystem 220 to quarantine the component application.

If the WSDL portion is valid, the process continues at step 2016 wherein the component application mapping is retrieved from the WSDL portion and deployed. In step 2018, java class files are deployed for facilitating the SOAP connections required for the mapping. An example of such a file is the AXIS java class file. AXIS (Apache eXtensible Interaction System) provides transparent access to web services for Java programmers. AXIS is known in the art and need not be described in great detail.

In step 2022, a lifecycle message is created from the component application information within the acknowledgment message. The lifecycle message is transformed into the internal message format by the transformation subsystem 226. In step 2024, the lifecycle message in its internal form is delivered to the system connector 804. In step 2026, the system connection 804 delivers the provisioning status information to the lifecycle subsystem 220. In step 2028, the lifecycle subsystem 220 updates the device information stored therein and in step 2030 creates a provisioning status message. The provisioning status message may be used to update external listeners that are registered with the lifecycle subsystem 220 for notifications. As an example, a carrier billing system can register with the application gateway server 116 to be notified when customers download applications. The carrier billing system can then bill a customer's account in accordance with the applications downloaded.

In step 2032 the messaging subsystem 224 contacts the administration server 208 for retrieving a list of registered service provider lifecycle listeners. In step 2034, for each of the registered service provider lifecycle listeners, the lifecycle message is transmitted via the WS-Eventing connector 810.

Therefore, the lifecycle subsystem 220 and appropriate service provider lifecycle systems are informed of the component applications installed on each of the wireless devices. In this manner, the lifecycle subsystem 220 can ensure that the appropriate devices are upgrade when required.

Figure 21:
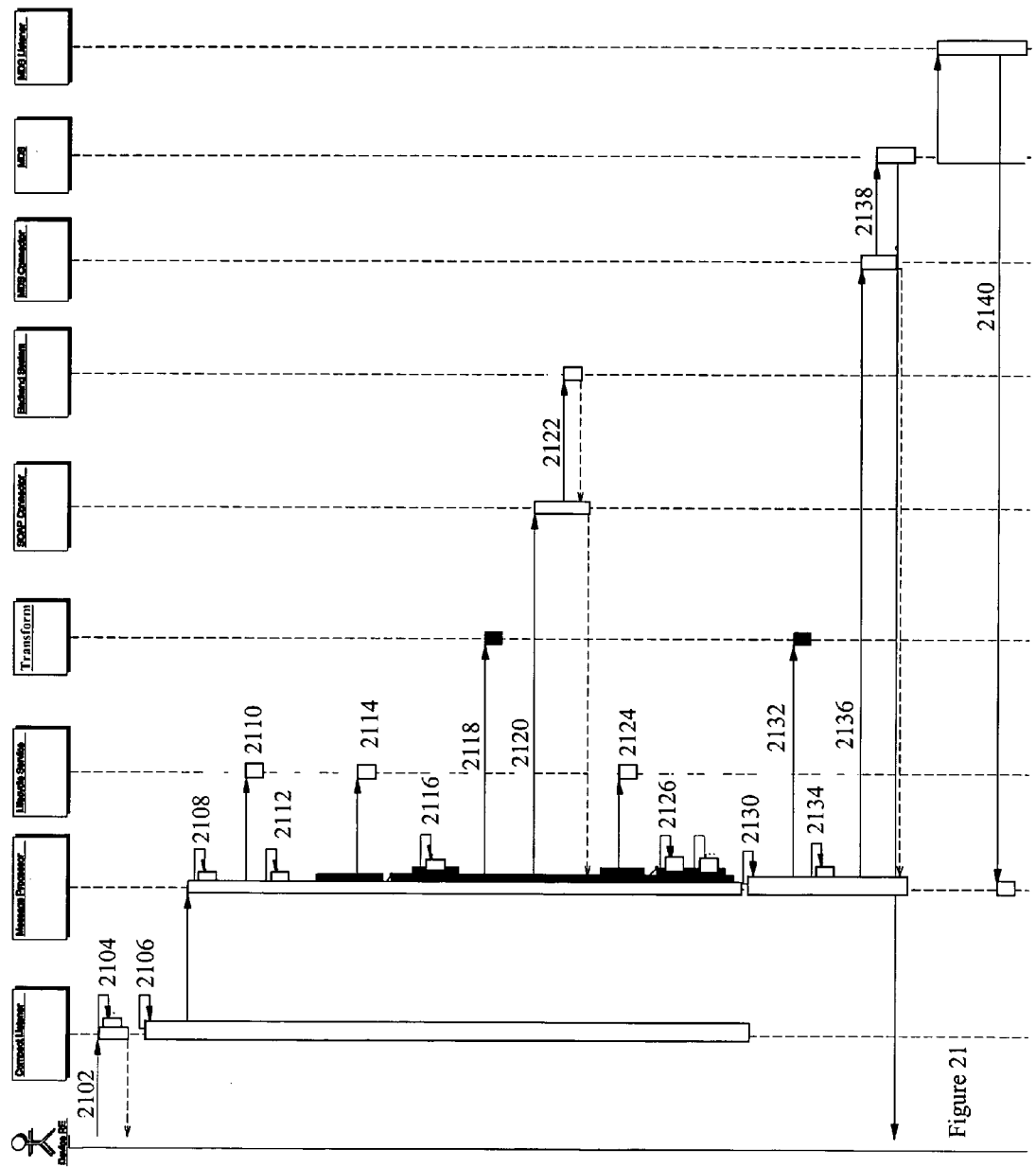
FIG. 21 is a flow diagram illustrating processing a message from a component application.

Referring to FIG. 21, an example of message processing between the wireless device 102 and the application gateway 106 is illustrated. In step 2102, the device runtime transmits a compact message to the application gateway 106. In step 2104, the compact message listener 304 receives and queues the message. In step 2106, the compact message listener preprocesses the message and delivers it to the message broker 602.

In step 2108, the message broker 602 decrypts and validates the message signature if it is required to do so. In step 2110, the message broker 602 checks with the lifecycle service 402 to verify that the component application associated with the message is installed on the wireless device 102. If the component application is not installed on the wireless device 102, then an error message is returned.

In step 2112, the message depot 604 is checked to determine if a mapping exists for the component applications. In step 2114, if the mapping does not exist, the component application is quarantined and an error message is returned to the wireless device 102. In step 2116 if the mapping does exist, the destination backend server 108 is determined in accordance with the origin of the message and the mapping. The message is stored in the message depot 404. In step 2118, the message broker 602 sends the message to the transformation subsystem 226 where it is converted to the internal message format by the decompact transformer 704 and returned to the message broker 602. In step 2120, the message processor delivers the message to the appropriate backend connector 806 in the connector subsystem 222. In this example, the SOAP connector 810 is used. In step 2122, the backend connector 806 attempts to transmit the message to the backend system 108 using the required protocols. In the present embodiment, the communication between the application gateway server 118 and the backend system 108 is synchronous. Accordingly, when the backend server returns a response the application gateway will know the destination application and wireless device 102. The back end system 108 responds to the backend connector 806, which transmits the response to the message broker 602.

In step 2124, if the response indicates that the attempted communication failed and the response meets certain criteria for quarantine the component application is marked for quarantine in the lifecycle service 402. An example of criteria for quarantine includes a change in Web Service, which invalidates the mapping deployed in the application gateway 118. The associated application should be quarantined because the application cannot be used until the Web Service reverses the change or becomes backward compatible.

Otherwise, in step 2126 the message processor sends the response to the transformation subsystem 226 where it is converted to the compact message format by the compact transformer 702 and returned to the message broker 602. In step 2128, the response is placed in a queue for transmission to the wireless device 102. In step 2126, the message is placed in a message response queue. In step 2130, the message is retrieved from the queue in turn and preprocessed by bundling it with other message pending delivery to the same wireless device 102. In step 2132, the message is sent to the compact transformer 702 for transformation into the compact message form and in step 2134, the message is encrypted, if required.

In step 2136, the message processor transmits the response to the MDS 116, which, in step 2138, transmits the response to the wireless device 102. In step 2140, the MDS 116 transmits a message to the message broker 602, acknowledging that the response has been sent.

Figure 22:
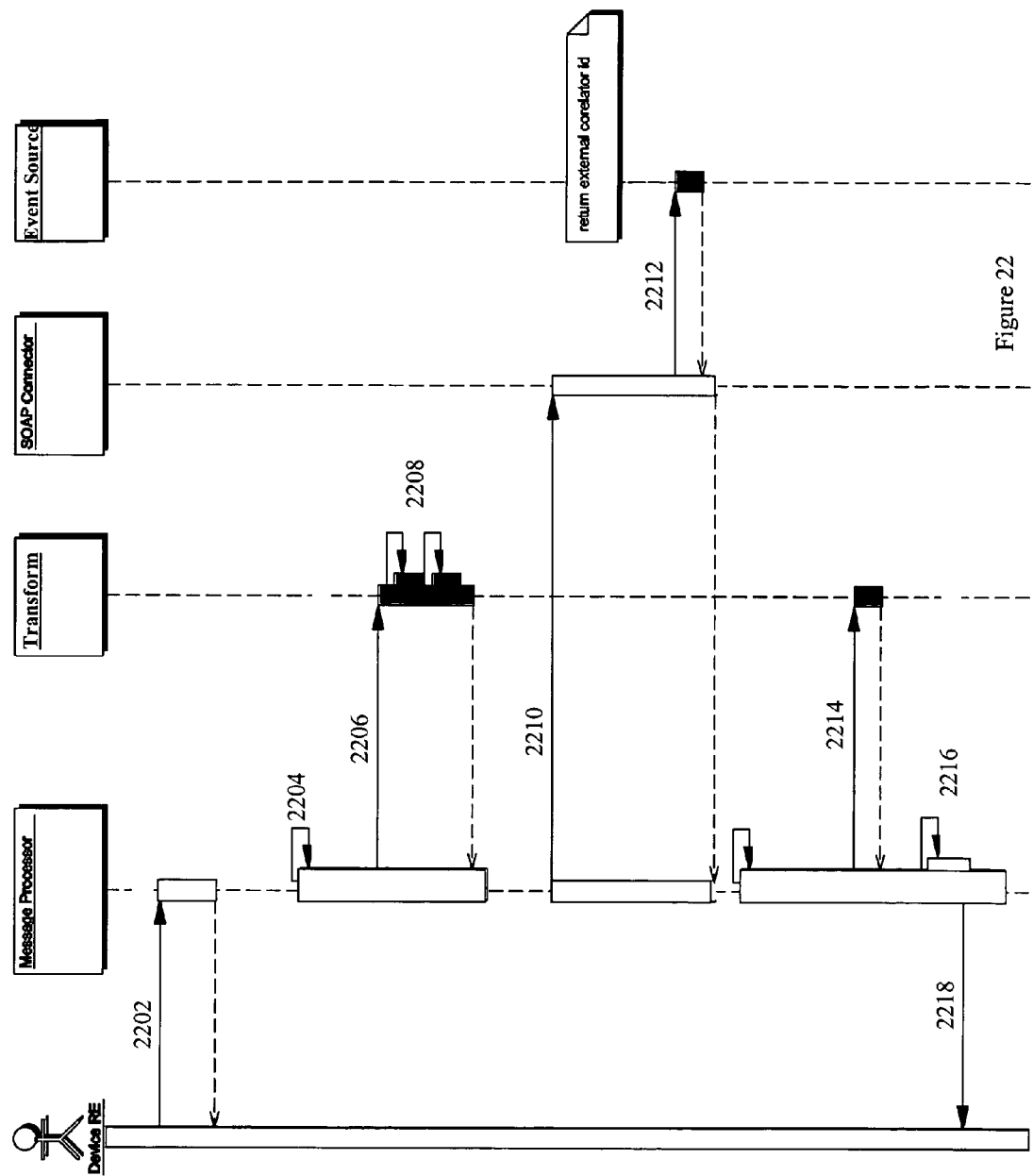
FIG. 22 is a flow diagram illustrating notification subscription.

Referring to FIG. 22, an example of a subscription for notification is illustrated. This example shows how, upon reception of a message from the component application, the application gateway 106 can subscribe for notifications from an event source implementing the WS-Eventing protocol. In this example, two assumptions are made. The first assumption is that the application gateway 106 knows, from component application mapping, that the message is a subscription message. The second assumption is that the application gateway 106 knows, once again from the mapping, how to construct of a subscription filter from the message content received from the component application.

In step 2202, the runtime environment transmits a subscription message, including a wireless device identifier, a component application identifier, and a subscription identifier, to the message broker 602.

In step 2204, the message broker 602 uses the mapping information of the component application for creating internal subscription information. In step 2206, the message processor transmits the subscription information to the transformation subsystem 226. In step 2208, the transformation subsystem transforms both the subscription filter and the message into the internal message format and returns it to the message broker 602.

In step 2210, the message broker 602 transmits the subscription to the backend connector 806, which is the SOAP connector 810 in this example. In step 2212, the SOAP connector 810 transmits the subscription request to the backend 108, which responds with an external correlator identifier or an error message. The SOAP connector 810 returns the response to the message broker 602.

In step 2214, the message broker 602 transmits the response to the transformation subsystem 226 for transformation to the compact message format. In step 2216, the external correlator identifier is stored in the message depot and in step 2218, a message is returned to the runtime environment indicating whether or not the subscription request succeeded.

Figure 23:
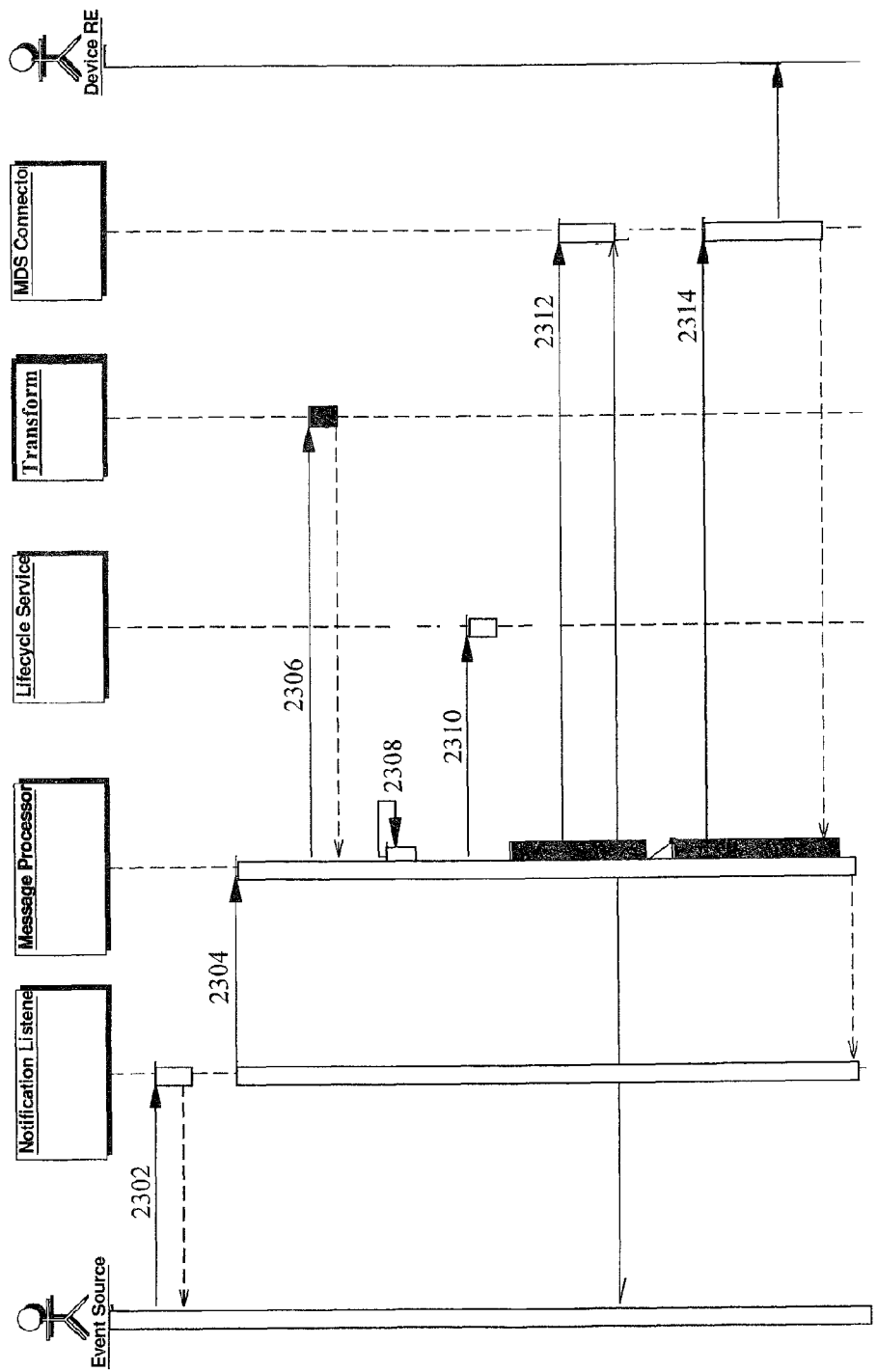
FIG. 23 is a flow diagram illustrating delivery of a notification.

Referring to FIG. 23, an example of delivery of a notification is illustrated. This example shows the reception, processing and delivery to the correct device (or devices) of a notification message through the application gateway notification listener 302. In this example, two assumptions are made. The first assumption is that the Event Source is a WS-Eventing event source. The second assumption is that the application gateway 106 knows, from stored subscription information and component application mapping, how to associate a notification message with a subscription and deliver it to the appropriate destination.

In step 2302, the event source transmits a notification to the notification listener of the message listeners 232. In step 2304, the notification listener transmits the message to the message broker 602. In step 2306, the message processor transmits the message to the transformation subsystem 226, which converts the message to the internal message format and returns it to the message broker 602.

In step 2308, the message broker 602 locates the correlation information in the message depot using the external correlator identifier, which is transmitted with the notification. In step 2310, the message broker 602 validates the associated component application in the lifecycle subsystem 220. If the component application is not available, in step 2312 the message broker 602 sends a message to the runtime environment via the MDS 116 to unsubscribe for these notifications. If the component application is available, in step 2314 the message broker 602 forwards the message from the notification to the subscriber via the MDS 116.

Figure 24:
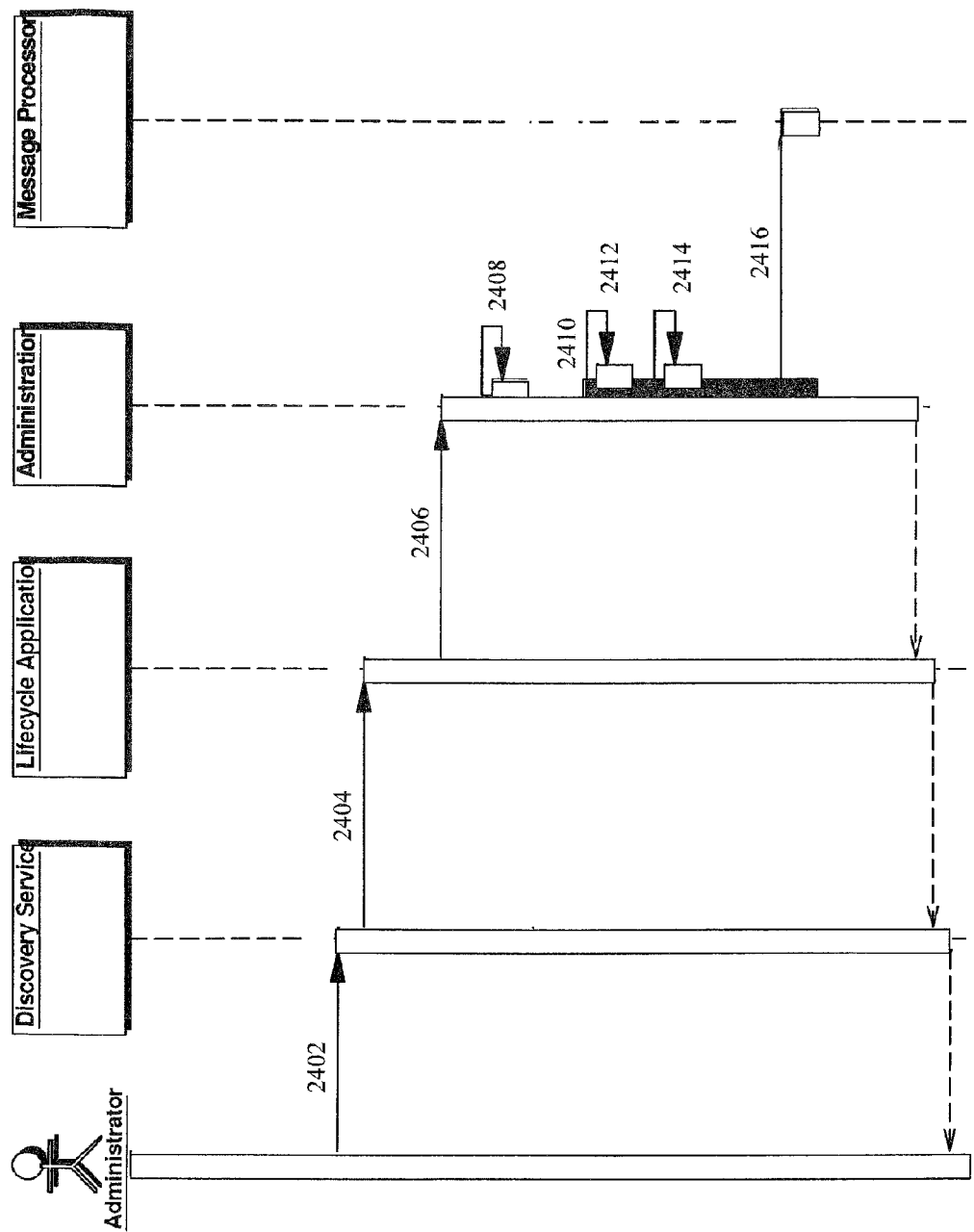
FIG. 24 is a flow diagram illustrating delivery of a component application upgrade notification.

Referring to FIG. 24, an example of signaling to the device runtime that a component application upgrade is available is illustrated. In this example, an administrator of the Discovery Service or another external system initiates an 'Upgrade Available' message. The 'Upgrade Available' message informs the wireless device 102 of the availability of an upgraded component application in the local or trusted UDDI registry 1304.

In the present example, three assumptions are made. The first assumption is that the external system is trusted and has been successfully authenticated by the lifecycle subsystem 220. The second assumption is that the external system knows how to communicate with application through the published service provider lifecycle application. The third assumption is that the external system has the ability to provide a valid component application deployment descriptor.

In step 2402, the administrator transmits a notification of a component application upgrade to the discover service 1302. In step 2404 the discovery service 1302 transmits the notification to the lifecycle subsystem 220. In step 2406, the lifecycle subsystem 220 sends the notification to the administration subsystem 208.

In step 2408, administration subsystem 208 updates the version information for the component application. In step 2410, it is determined if automatic notification has been activated. If automatic notification is off, nothing further is done in the way of notifying the wireless device 102. If automatic notification is on, the process proceeds to step 2412 where a list of the devices to be notified is retrieved. In step 2414, a compact message of the notification is constructed for multiple wireless devices 102 and in step 2416 the message is transmitted. Once the wireless devices 102 receive the upgrade notification, they can upgrade the component application in a similar fashion to obtaining a new component application. However, since the upgrade notification includes information similar to that included in the deployment descriptor, the deployment descriptor need not be used.

Figure 25:
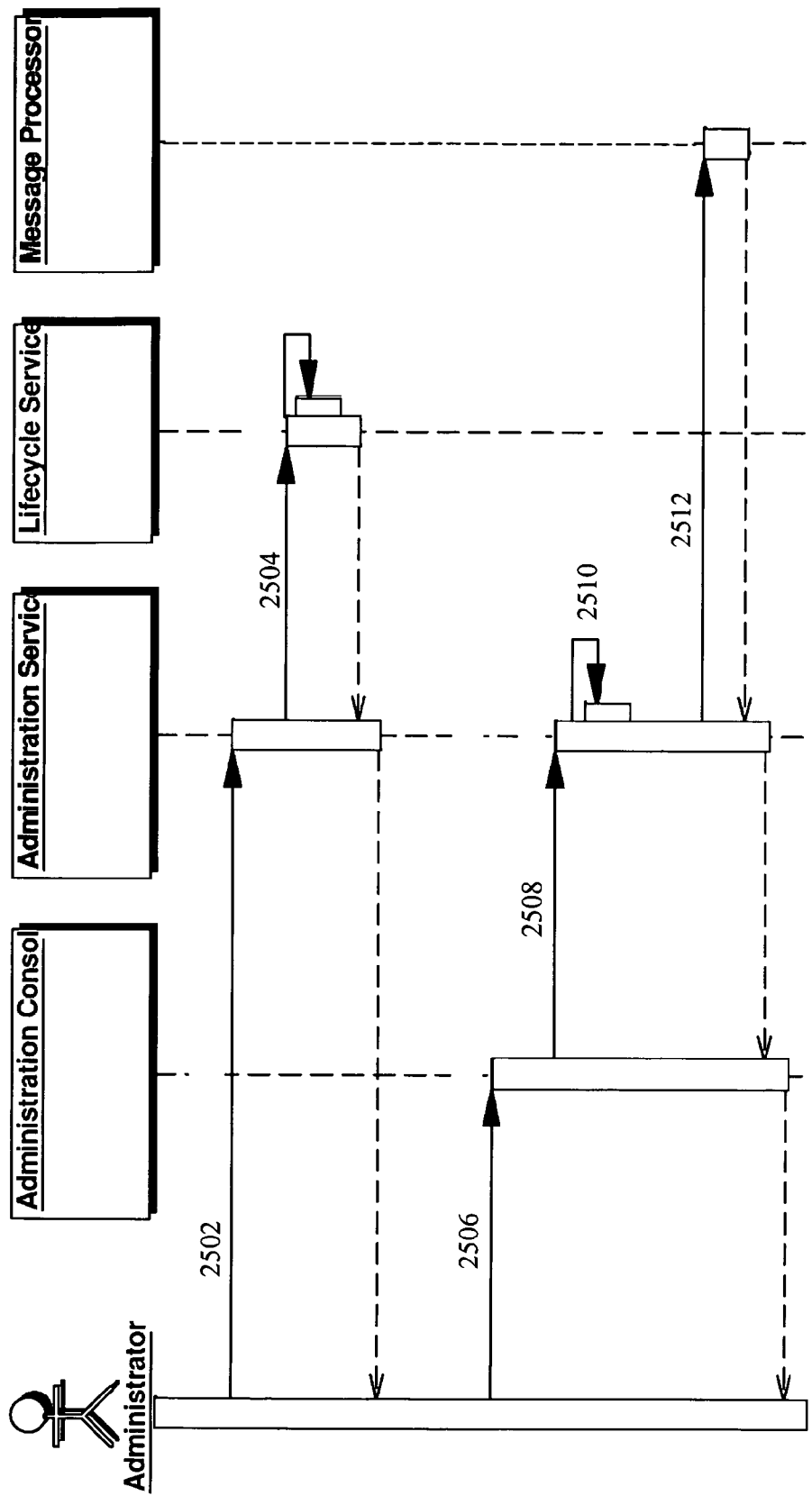
FIG. 25 is a flow diagram illustrating delivery of a runtime environment upgrade notification.

Referring to FIG. 25, an example of signaling to the device runtime that a runtime environment upgrade is available is illustrated. This example illustrates an administrator initiation of an event for runtime environment upgrading, including one or more runtime environment components.

In step 2502, the administrator prepares a list of wireless device parameters and submits it to the administration subsystem 108. In step 2504, the administration subsystem 108 queries the lifecycle subsystem 120 and in step 2504, a list of device satisfying the parameters is returned to the administrator. In the present example, the parameter is likely a runtime environment version, and therefore a list includes all devices having the specified runtime environment version.

In step 2506, the administrator submits the list to the administration console 504 along with a runtime environment upgrade request. In step 2508, the administration console 504 transmits the request to the administration service 502. In step 2510, the administration service 502 constructs a compact message of the upgrade for multiple wireless devices 102 and in step 2512 the message is transmitted. Once the wireless devices 102 receive the upgrade notification they can upgrade the runtime environment in a similar fashion to obtaining a new runtime environment. However, before upgrading the runtime environment, all applications and application data in the runtime environment are converted to XML/script form. The runtime environment is updated and the applications and application data are restored from the XML/script form for the new runtime environment.

Figure 26:
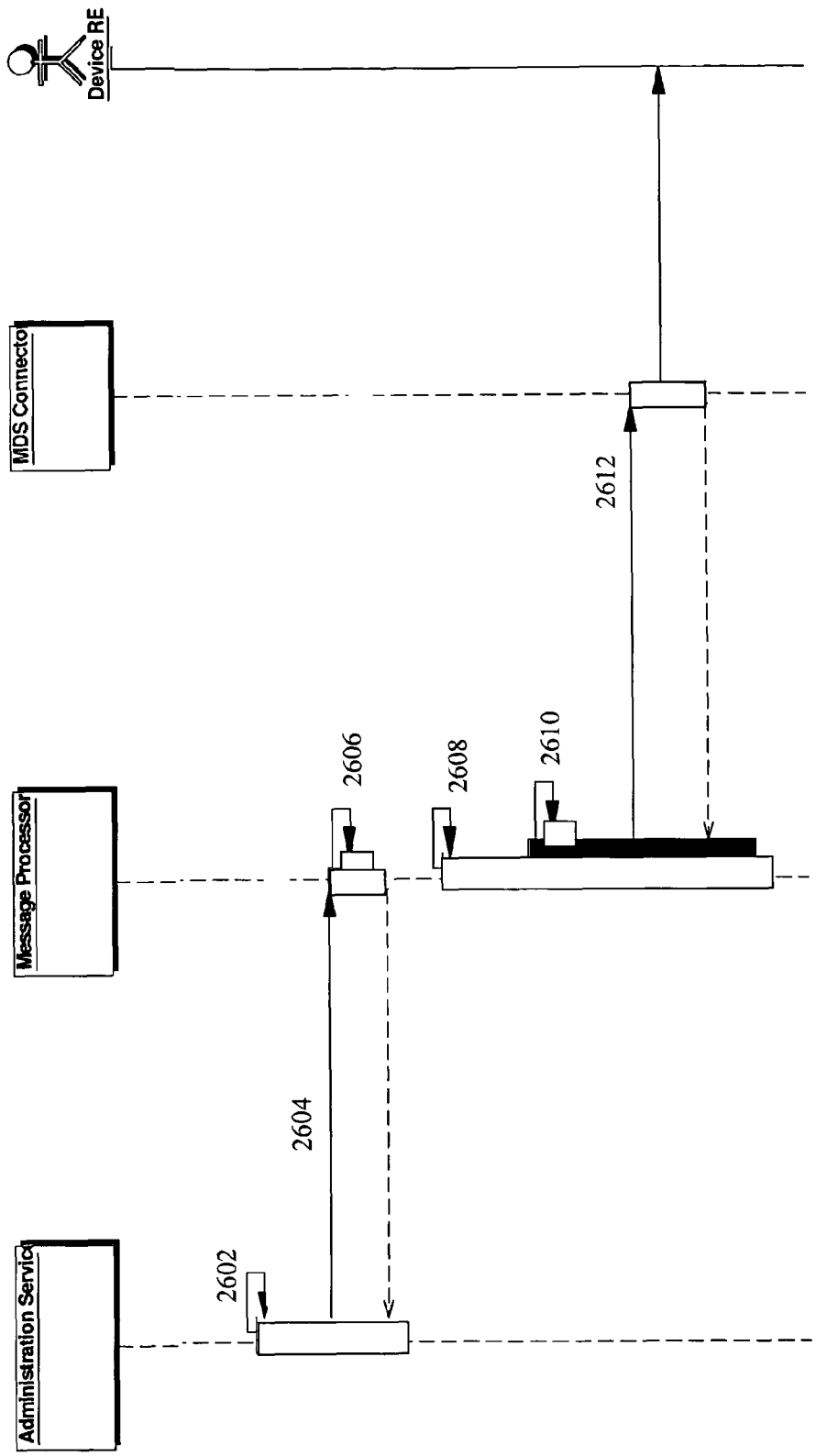
FIG. 26 is a flow diagram illustrating scheduled task delivery.

In many of the situations described above, it was required to transmit a common compact message to multiple wireless devices. This process is referred to as scheduled task delivery and is described as follows. Referring to FIG. 26, an example of scheduled task delivery is illustrated. In step 2602 the administration service 502 prepares a message to be transmitted to a plurality of wireless devices 102. In step 2604, the message is sent to the message broker 602.

In step 2606, the message broker 602 schedules a task to push the message in a timed or group manner. In step 2608, the message broker 602 runs the scheduled task. In step 2610, for each device in the group, the message broker 602 creates a system message and, in step 2612, delivers the message to the wireless device 102 via the MDS 116.

Accordingly, it can be seen that the application gateway server 118 allows generic wireless applications to communicate with generic schema based backend servers 108 without deploying application specific code within the application gateway server 118 itself. Rather, the gateway loads an application mapping and converts inbound and outgoing application messages into formats and protocols specific for the selected data source.

Throughout the description several terms were used consistently for ease of explanation. However, a person skilled in the art will appreciate that these terms are in no way meant to limit the application. For example, although reference was made to a wireless device, other wired computing devices, such as a desktop computer, may also be used. Accordingly, the term device is used generically to refer to any wired or wireless device such as a desktop computer, a laptop or mobile computer, a smart phone, a personal digital assistant, and the like.

As another example, although the compact message format is described as being used to communicate between the application gateway 106 and the device 102, this need not be true. One reason for using the compact message format is to save bandwidth. Accordingly, for systems where bandwidth is not a concern the compact message format does not need to be used.

In all of the examples described herein, the device runtime is responsible for retrieving the packaged application once it has been provisioned. This is typically preferred because providing the runtime environment with control over what is downloaded inhibits junk applications from being pushed to the device 102. However, this need not be the case and the packaged application can be pushed to the device if desired.

Although not explicitly described, the encryption scheme used for the system is as follows. Messages sent between the device 102 and the application gateway 106 are encrypted using symmetric key cryptography. Symmetric key cryptography is used because it is relatively convenient to securely transmit a symmetric key to the device. Public/private key pair cryptography is used for securely transmitting messages between the gateway server and external systems, for the convenience allowing any system to securely transmit a message to the gateway server. As will be appreciated by a person skilled in the art, the selection of an encryption scheme is a design choice and various encryption schemes, and combinations thereof, may be used.

Component Application

Figure 27:
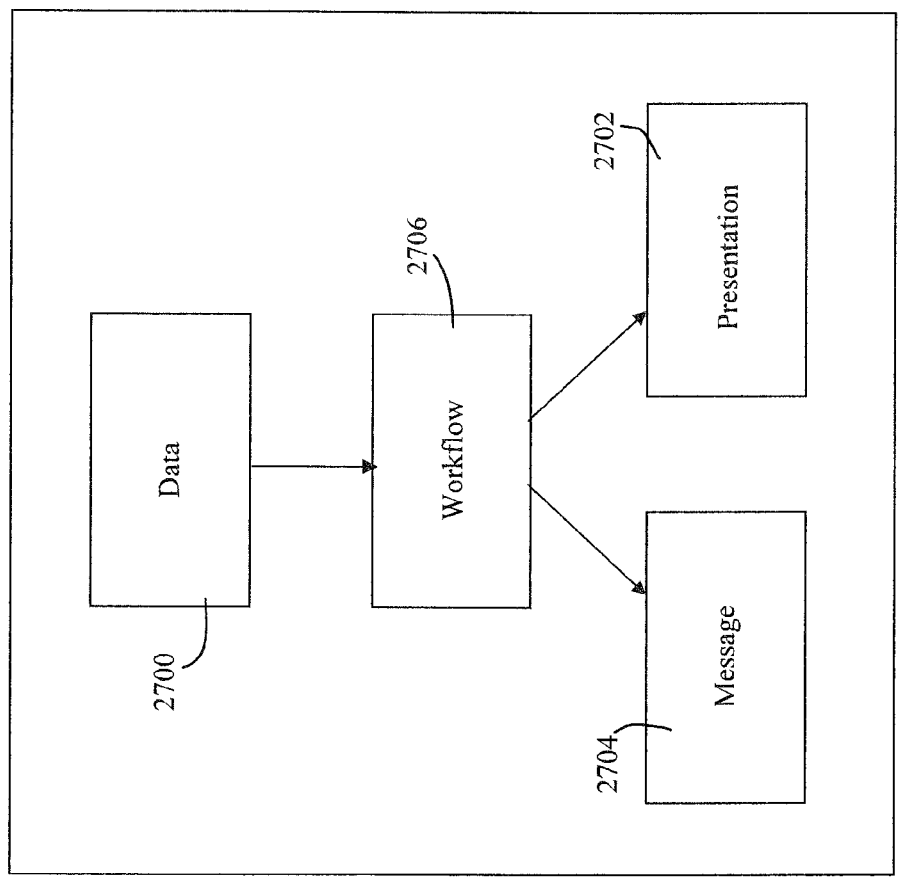
FIG. 27 is a block diagram illustrating a component application.

Referring to FIG. 27, a block diagram of the component application comprises the data components 2700, the presentation components 2702 and the message components 2704, which are coordinated by workflow components 2706 through communications with the application container 300. The structured definition language can be used to construct the components 2700, 2702, 2704 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 2700, 2702, 2704 to be processed by the device infrastructure 204 (see FIG. 2), and encoding schemes include such as but not limited to XML, HTML, XHTML, XSML, RDF, Machine Readable Cataloging (MARC), and Multipurpose Internet Mail Extensions (MIME).

The data components 2700 define data entities which are used by the component application program. Examples of data entities which data components 2700 may describe are orders, users, and financial transactions. Data components 2700 define what information is required to describe the data entities, and in what format the information is expressed. For example, the data component 2700 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 2700. Since data parts (elements) are usually transferred from message to message according to Web Services choreography rules, preferably there is persistence of data components 2700. Data components 2700 may be dynamically generated according to Web Service(s) choreography definitions (if available) or defined by the application designer based on complex type definitions and/or message correlation information.

The message components 2704 define the format of messages used by the component application program 302 to communicate with external systems such as the web service. For example, one of the message components 2704 may describe such as but not limited to a message for placing an order which includes the unique identifier for the order, the status of the order, and notes associated with the order. Message component 2704 definitions written in the structured definition language can uniquely represent (and map to) WSDL messages, and can be generated dynamically at runtime. Accordingly, the dynamic generation can be done for the component definitions for client application messages, and associated data content, from standard Web Service metadata in the definition language used to express the web service interface, for example such as but not limited to WSDL and BPEL. Web Services messages are defined within the context of operation and there is defined correlations between the message components 2704 in the component application program definition. This correlation could be done using predefined message parameters and/or through separate workflow components 2706, as further defined below.

The presentation components 2702 define the appearance and behavior of the component application program as it displayed by a user interface. The presentation components 2702 can specify graphic user interface (GUI) screens and controls, and actions to be executed when the user interacts with the component application using the user interface. For example, the presentation components 2702 may define screens, labels, edit boxes, buttons and menus, and actions to be taken when the user types in an edit box or pushes a button. The majority of Web Service consumers use a visual presentation of Web Service operation results, and therefore provide the runtime environment on their devices capable of displaying user interface screens.

It is recognized that in the above described client component application program definitions hosting model, the presentation components 2702 may vary depending on the client platform and environment of the device. For example, in some cases Web Service consumers do not require a visual presentation. The application definition of the components 2700, 2702, 2704, 2706 of the component application program 302 can be hosted in a Web Service registry in a metadata repository 700 as a bundle of platform-neutral data 2700, message 2704, workflow 2706 component descriptors with a set of platform-specific presentation component 2702 descriptors for various predefined client runtimes. When the discovery or deployment request message is issued the client type should be specified as a part of this request message. In order not to duplicate data, message, and workflow metadata while packaging component application programs for different client platforms of the devices, application definitions can be hosted on the application server, for example, as a bundle of platform-neutral component definitions linked with different sets of presentation components 2703a, 2703b, 2703c, representing the different supported user interfaces of the devices. It is also recognized that a standard presentation component 2702 can be used in the event the specific device is not explicitly supported, thereby providing at least a reduced set of presentation features. When a user makes a discovery or download request message, the client runtime type of the devices is validated and the proper bundle is constructed for delivery by the web server 106 to the device 100 over the network 104. For those Web Service consumers, the client application programs 302 could contain selected presentation components 2703 linked with the data 2700 and message 2704 components through the workflow components 2706, thereby providing a customized component application 302.

The workflow components 2706 of the component application program define processing that occurs when an action is to be performed, such as an action specified by a presentation component 2702 as described above, or an action to be performed when messages arrive from the system. Presentation workflow and message processing are defined by the workflow components 2706. The workflow components 2706 are written as a series of instructions in a programming language or a scripting language, such as but not limited to ECMAScript, and can be compiled into native code and executed by the application container, as described above. An example of the workflow components 2706 may be to assign values to data, manipulate screens, or send the message. The workflow component 2706 supports a correlation between the messages and defines application flow as a set of rules for operations on the other components 2700, 2702, 2704.

Device Runtime Environment

The device runtime environment loads the metadata contained in the component 2700, 2702, 2704, 2706 definitions and the builds an executable version of the application program 302 on the device 100, via an application container 300. For example, there are two operational models for client runtime: template-based native execution and metadata-based execution. With the template-based native execution model the runtime hosts data, message, and screen templates pre-built on the device using the native code. When the application program definition is loaded, the client environment provided by the component framework fills the templates with metadata-defined parameters from the components 2700, 2702, 2704 and builds the executable client application program in the native format. The workflow script (for example ECMAScript) of the workflow component 2706 could be either converted to native code or executed using an ECMAScript Interpreter to a native code redirector, where the redirector interprets calls to the scripting language into operations on native components through a native runtime engine. With the metadata-based execution, the runtime environment of the component framework either keeps component 2700, 2702, 2704, 2706 definitions in XML (for example), which are parsed during execution time or uses native representation of XML nodes. During execution, the native runtime engine 506 operates on definitions of the components 2700, 2702, 2704, 2706 rather than on native component entities. It is recognized that the template based approach can be more performance efficient over the metadata based execution, but can require a more sophisticated execution environment and more memory resources.

Although preferred embodiments of the invention have been described herein, it will be understood by those skilled in the art that variations may be made thereto without departing from the spirit of the invention or the scope of the appended claims.

What is claimed is:

1. A system comprising:
  an application gateway server configured for provisioning component applications for retrieval by a device, the application gateway server comprising:
  a memory for storing instructions;
  a processor configured to execute the instructions comprising
    a message broker to communicate with the device through a network, the application gateway server further configured to communicate with a provisioning server and a discovery server;

a packaging application to retrieve a component application bundle, select a subset of components from the component application bundle in accordance with the device information associated with the device for which the component application is being provisioned, create a component application package comprising the selected sub-set of components, and make the component application package available to the device through the network, the component application to be executed on the device;

the provisioning server comprising memory for storing instructions and a processor configured to execute the instructions to provide a provisioning service to service a provisioning request and a component application depot storing packaged component applications;

the discovery server comprising memory for storing instructions and a processor configured to execute the instructions to store and manage component application bundles; and and wherein the packaged component application comprises the selected components including the plurality of components comprising data components, presentation components and message components, expressed in a structured definition language and coordinated by one or more workflow components expressed as the series of instructions, the selected components further comprising one set of device-specific components selected from the one or more sets of device-specific components of the component application bundle.

2. The system of claim 1, wherein the packaging application makes the packaged component application available to the device by storing it and transmitting its storage location to the device.

3. The system of claim 2, where the storage location of the packaged component application is identified by a Uniform Resource Locator (URL).

4. The system of claim 2, wherein packaged component applications are retrieved by a runtime environment on the device.

5. The system of claim 2, wherein packaged component applications are pushed to the runtime environment on the device.

6. The system of claim 1, wherein the selected device-specific components comprise presentation components describing screens of a graphical user interface of the application for specific devices.

7. The system of claim 1, wherein the packaging application selects localization information from a plurality of available information in accordance with device preferences.

8. The system of claim 1, wherein the packaging application is provided by the provisioning server.

9. The system of claim 1, wherein the packaging application is provided by a third party application server.

10. The system of claim 1, wherein the component application bundle includes mapping information and the packaging application provides the mapping information to the message broker for facilitating messaging between the device and a backend server required by the component application.

11. The system of claim 9, wherein the application gateway server further includes a lifecycle subsystem for managing the device and tracking which of a plurality of component applications are provisioned for each of a plurality of devices.

12. A method for provisioning a component application for a device by a gateway application server, the method comprising the steps of:

(a) receiving, at the gateway application server, a request to provision a component application including device information;

(b) determining whether or not the component application is packaged and, if so, making it available to the device;

(c) locating and retrieving a component application bundle, associated with the component application, from a component application depot for packaging, the application bundle comprising components selectable for the associated component application;

(d) packaging the component application by selecting components from the component application bundle in accordance with the device information for which the component application is being provisioned for execution on the device, creating a component application package comprising the selected components; and (e) making the packaged component application available to the device for retrieval by the device through a network; and wherein the packaged component application comprises the selected components including the plurality of components comprising data components, presentation components and message components expressed in a structured definition language and coordinated by one or more workflow components expressed as the series of instructions, the selected components further comprising one set of device-specific components selected from the one or more sets of device-specific components of the component application bundle.

13. The method of claim 12, wherein the packaged component application is made available to the device by storing it and transmitting its storage location to the device.

14. The method of claim 13, where the storage location of the packaged component application is identified by a Uniform Resource Locator (URL).

15. The method of claim 13, wherein packaged component applications are retrieved by a runtime environment on the device.

16. The method of claim 13, wherein packaged component applications are pushed to the runtime environment on the device.

17. The method of claim 12, wherein the component application request is initiated by the device's user.

18. The method of claim 12, wherein the component application request is initiated by an administrator.

19. The method of claim 12, wherein the component application request is initiated by a third party.

* * * * *